(12) United States Patent
Yamashita et al.

(10) Patent No.: US 8,267,785 B2
(45) Date of Patent: Sep. 18, 2012

(54) GAME APPARATUS AND COMPUTER READABLE STORAGE MEDIUM HAVING GAME PROGRAM STORED THEREON

(75) Inventors: Yoshikazu Yamashita, Kyoto (JP); Ichiro Suzuki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 532 days.

(21) Appl. No.: 12/340,820

(22) Filed: Dec. 22, 2008

(65) Prior Publication Data

US 2010/0113151 A1    May 6, 2010

(30) Foreign Application Priority Data

Oct. 30, 2008    (JP) .................................. 2008-280190

(51) Int. Cl.
*A63F 13/06* (2006.01)
*A63F 13/02* (2006.01)
(52) U.S. Cl. .................... 463/36; 436/3; 436/7; 436/37; 436/39; 436/58
(58) Field of Classification Search .................. 463/3, 7, 463/36, 37, 39, 58
See application file for complete search history.

(56) References Cited

U.S. PATENT DOCUMENTS

| 2005/0085298 | A1* | 4/2005 | Woolston | 463/37 |
| 2006/0274032 | A1* | 12/2006 | Mao et al. | 345/156 |
| 2008/0009348 | A1 | 1/2008 | Zalewski et al. | |
| 2008/0015017 | A1 | 1/2008 | Ashida et al. | |
| 2008/0080789 | A1 | 4/2008 | Marks et al. | |
| 2008/0134784 | A1* | 6/2008 | Jeng et al. | 73/514.01 |
| 2008/0255795 | A1* | 10/2008 | Shkolnikov | 702/141 |
| 2009/0009471 | A1* | 1/2009 | Yamamoto et al. | 345/158 |
| 2010/0004896 | A1* | 1/2010 | Yen et al. | 702/153 |
| 2010/0113153 | A1* | 5/2010 | Yen et al. | 463/37 |

FOREIGN PATENT DOCUMENTS

| EP | 1816552 A2 | 8/2007 |
| EP | 1832323 A1 | 9/2007 |
| EP | 1852163 A2 | 11/2007 |
| JP | 2000-308756 | 11/2000 |
| JP | 2007-283134 | 11/2007 |
| JP | 2007-296247 | 11/2007 |
| WO | WO2006/090197 A1 | 8/2006 |
| WO | WO2007/045021 A1 | 4/2007 |

OTHER PUBLICATIONS

R. H. Templer, "Rotational Dynamics—Internal Motion II", http://www.ch.ic.ac.uk/local/physical/mi_4.html.*
Algrain and Saniie, "Estimation of 3-D Angular Motion Using Gyroscopes and Linear Accelerometers", IEEE Transactions on Aerospace and Electronic Systems vol. 27. No. Nov. 6, 1991.*
European Search Report in corresponding European Application No. 08022269.8 dated Feb. 22, 2012.

* cited by examiner

*Primary Examiner* — Fernando L Toledo
*Assistant Examiner* — Peter Bradford
(74) *Attorney, Agent, or Firm* — Nixon & Vanderhye P.C.

(57) ABSTRACT

First, operation data including at least acceleration data and angular velocity data is obtained from an input device including at least an acceleration sensor and a gyrosensor. Next, based on the acceleration data and the angular velocity data, a moving velocity of the input device itself and/or a relative positional relationship between the input device and a center of a rotation motion applied on the input device itself is estimated. Then, predetermined game processing is executed based on the estimated moving velocity and/or relative positional relationship.

31 Claims, 23 Drawing Sheets

GAME APPARATUS AND COMPUTER READABLE STORAGE MEDIUM HAVING GAME PROGRAM STORED THEREON

CROSS REFERENCE TO RELATED APPLICATION

The disclosure of Japanese Patent Application No. 2008-280190, filed on Oct. 30, 2008 is incorporated herein by reference.

TECHNICAL FIELD

The present invention relates to a game apparatus for executing a game using a gyrosensor and an acceleration sensor, and a computer readable storage medium having a game program for such a game stored thereon; and more specifically to a game apparatus for detecting a motion applied on an input device and reflecting the motion to game processing, and a computer readable storage medium having a game program for such game processing stored thereon.

BACKGROUND AND SUMMARY

Conventionally, an input control device for a game apparatus, which includes a gyrosensor and an acceleration sensor (for example, Japanese Laid-Open Patent Publication No. 2000-308756) is known. Such an input control device is shaped as a rod, and game processing of playing with this input control device treated as a sword is executed. In such game processing, data on a motion of swinging a sword, for example, data on whether the swing is strong or weak, or whether the sword is moved forward or rearward, rightward or leftward, or upward or downward, is created based on an output from the acceleration sensor. Also, data on a posture at which the sword is swung (twisted), or data on a posture at which the sword is inclined forward or rearward, or rightward or leftward, is created based on an output from the gyrosensor. Based on the data thus created, how an object in the game (sword in this case) is moved is output to a game screen of the monitor.

However, the game processing using the above-described input control device has the following problems. First, for detecting each motion of the input control device, an output of only one of the gyrosensor and the acceleration sensor is used. More specifically, an output from only the acceleration sensor is used for detecting a motion of swinging the sword, whereas an output from only the gyrosensor is used for detecting a motion of swinging the sword. Therefore, nothing has been disclosed regarding an operation based on, for example, a moving velocity or the like. It is conceivable that the moving velocity is calculated from an integral of the acceleration, but this involves the problem that an error is likely to occur. In addition, when a rotation motion of moving the input control device in a circle is performed, the size of the circle of such a rotation motion (the radius or diameter of the circle) cannot be found.

Therefore, a feature of the present invention is to provide a game apparatus for allowing a game using both an acceleration sensor and a gyrosensor to be played by novel control. Another feature of the present invention is to provide a game apparatus for allowing a game using both an acceleration sensor and a gyrosensor to be played with control based on a moving velocity or a rotation radius of an input device.

The present invention has the following features. The reference numerals, additional descriptions and the like in parentheses in this section of the specification indicate an example of the correspondence with the embodiments described later for easier understanding of the present invention, and do not limit the present invention in any way.

A first aspect of the present invention is directed to a game apparatus comprising operation data obtaining means (10), estimation means (10), and game processing means (10). The operation data obtaining means obtains operation data including at least acceleration data and angular velocity data from an input device including at least an acceleration sensor and a gyrosensor. The estimation means estimates a moving velocity of the input device itself and/or a relative positional relationship between the input device and a center of a rotation motion applied on the input device itself, based on the acceleration data and the angular velocity data. The game processing means executes game processing based on the estimated moving velocity and/or relative positional relationship.

According to the first aspect, the center of the rotation motion applied on the input device and the moving velocity can be estimated, and a game apparatus having a novel operability can be provided.

In a second aspect based on the first aspect, the estimation means estimates the moving velocity of the input device itself and/or the relative positional relationship by performing an approximation on the rotation motion, the approximation ignoring an influence of a change of the center of the rotation motion.

According to the second aspect, the center of the rotation motion applied on the input device and the moving velocity can be estimated with a simpler manner of processing.

In a third aspect based on the first aspect, the estimation means includes angular acceleration calculation means (10) for calculating angular acceleration data based on a change of the angular velocity data in a predetermined time period. The estimation means calculates the relative positional relationship based on the acceleration data, the angular velocity data and the angular acceleration data, and calculates the moving velocity based on the positional relationship and the angular velocity data.

According to the third aspect, the moving velocity of the input device can be calculated more appropriately.

In a fourth aspect based on the first aspect, the game apparatus further comprises posture calculation means (10) for calculating a posture of the input device based on the acceleration data and the angular velocity data.

According to the fourth aspect, game processing reflecting the posture of the input device can be executed.

In a fifth aspect based on the fourth aspect, the acceleration represented by the acceleration data includes a gravitational acceleration. The estimation means includes gravitational acceleration estimation means (10) for estimating the gravitational acceleration based on the posture of the input device calculated by the posture calculation means; and motion component calculation means (10) for calculating a motion component, which is an acceleration component other than a gravity component, by removing the gravitational acceleration from the acceleration represented by the acceleration data.

According to the fifth aspect, the center of the rotation motion and the moving velocity of the input device can be estimated more accurately.

In a sixth aspect based on the fourth aspect, the game processing means executes the game processing based on the posture of the input device calculated by the posture calculation means and the moving velocity calculated by the estimation means.

According to the sixth aspect, game processing reflecting the posture and the moving velocity of the input device can be executed, and a game apparatus for allowing a game to be played with a novel operation can be provided.

In a seventh aspect based on the sixth aspect, the game processing means determines a posture, in a virtual game space, of an operation target object, which is a target of an operation made by a player, based on the posture of the input device, and determines a position of the operation target object based on the moving velocity.

In an eighth sixth aspect based on the seventh aspect, the game processing means executes a control based on the posture of the input device, and based on the moving velocity, further changes an amount of control to be made based on the posture.

According to the seventh and eighth aspects, a motion applied on the input device by the player can be reflected on the game processing more accurately.

In a ninth aspect based on the first aspect, the game processing means executes a first control based on the moving velocity and executes a second control based on the positional relationship.

According to the ninth aspect, the moving velocity of the input device and the relative positional relationship between the center of the rotation motion and the input device can be separately processed, and a novel game can be provided.

In a tenth aspect based on the first aspect, the estimation means estimates the relative positional relationship as a value representing a radius of the rotation motion.

In an eleventh aspect based on the first aspect, the estimation means estimates the relative positional relationship as a vector from the center of the rotation motion to a position of the input device.

According to the tenth and eleventh aspects, data representing the relative positional relationship between the center of the rotation motion and the input device can be processed more simply.

In a twelfth aspect based on the tenth aspect, the game apparatus further comprises correction means for correcting the relative positional relationship in accordance with a magnitude of the angular velocity represented by the angular velocity data.

In a thirteenth aspect based on the twelfth aspect, the correction means performs a correction such that as the angular velocity is larger, the degree of the angular velocity being reflected on the relative positional relationship is higher, whereas as the angular velocity is smaller, the degree of the angular velocity being reflected on the relative positional relationship is lower.

According to the twelfth and thirteenth aspects, a motion applied on the input device by the player can be reflected on the game processing more accurately.

In a fourteenth aspect based on the fifth aspect, the estimation means calculates the positional relationship using the following expression.

$$Rs = \begin{pmatrix} -\omega^2 & -\dot{\omega}z & \dot{\omega}y \\ \dot{\omega}z & -\omega^2 & -\dot{\omega}x \\ -\dot{\omega}y & \dot{\omega}x & -\omega^2 \end{pmatrix}^{-1} A$$

Rs means a value represented as the positional relationship, A means a value represented as the motion component calculated by the motion component calculation means, and $\omega$ means a value of the angular velocity which is represented as the angular velocity data and is formed of three axis components of X, Y and Z axes perpendicularly crossing one another.

$\dot{\omega}x$ means a differential value of an X-axis component of the angular velocity, $\dot{\omega}y$ means a differential value of a Y-axis component of the angular velocity, and $\dot{\omega}z$ means a differential value of a Z-axis component of the angular velocity.

According to the fourteenth aspect, substantially the same effect as that of the first aspect can be provided.

A fifteenth aspect of the present invention is directed to a computer readable storage medium having stored thereon a game program to be executed by a computer of a game apparatus, the game program causing the computer to act as operation data obtaining means (S1), estimation means (S5, S6), and game processing means (S7, S8). The operation data obtaining means obtains operation data including at least acceleration data and angular velocity data from an input device including at least an acceleration sensor and a gyrosensor. The estimation means estimates a moving velocity of the input device itself and/or a relative positional relationship between the input device and a center of a rotation motion applied on the input device itself, based on the acceleration data and the angular velocity data. The game processing means executes game processing based on the estimated moving velocity and/or relative positional relationship.

In a sixteenth aspect based on the fifteenth aspect, the estimation means estimates the moving velocity of the input device itself and/or the relative positional relationship by performing an approximation on the rotation motion, the approximation ignoring an influence of a change of the center of the rotation motion.

In a seventeenth aspect based on the fifteenth aspect, the estimation means includes angular acceleration calculation means (S4) for calculating angular acceleration data based on a change of the angular velocity data in a predetermined time period. The estimation means calculates the relative positional relationship based on the acceleration data, the angular velocity data and the angular acceleration data, and calculates the moving velocity based on the positional relationship and the angular velocity data.

In an eighteenth aspect based on the fifteenth aspect, the game program causes the computer to further act as posture calculation means (S2) for calculating a posture of the input device based on the acceleration data and the angular velocity data.

In a nineteenth aspect based on the eighteenth aspect, the acceleration represented by the acceleration data includes a gravitational acceleration. The estimation means includes gravitational acceleration estimation means (S3) for estimating the gravitational acceleration based on the posture of the input device calculated by the posture calculation means; and motion component calculation means (S3) for calculating a motion component, which is an acceleration component other than a gravity component, by removing the gravitational acceleration from the acceleration represented by the acceleration data.

In a twentieth aspect based on the eighteenth aspect, the game processing means executes the game processing based on the posture of the input device calculated by the posture calculation means and the moving velocity calculated by the estimation means.

In a twenty-first aspect based on the twentieth aspect, the game processing means determines a posture, in a virtual game space, of an operation target object, which is a target of an operation made by a player, based on the posture of the input device, and determines a position of the operation target object based on the moving velocity.

In a twenty-second aspect based on the twenty-first aspect, the game processing means executes a control based on the posture of the input device, and based on the moving velocity, further changes an amount of control to be made based on the posture.

In a twenty-third aspect based on the fifteenth aspect, the game processing means executes a first control based on the moving velocity and executes a second control based on the positional relationship.

In a twenty-fourth aspect based on the fifteenth aspect, the estimation means estimates the relative positional relationship as a value representing a radius of the rotation motion.

In a twenty-fifth aspect based on the fifteenth aspect, the estimation means estimates the relative positional relationship as a vector from the center of the rotation motion to a position of the input device.

In a twenty-sixth aspect based on the twenty-fourth aspect, the game program causes the computer to further act as correction means for correcting the relative positional relationship in accordance with a magnitude of the angular velocity represented by the angular velocity data.

In a twenty-seventh aspect based on the twenty-sixth aspect, the correction means performs a correction such that as the angular velocity is larger, the degree of the angular velocity being reflected on the relative positional relationship is higher, whereas as the angular velocity is smaller, the degree of the angular velocity being reflected on the relative positional relationship is lower.

In a twenty-eighth aspect based on the nineteenth aspect, the estimation means calculates the positional relationship using the following expression.

$$Rs = \begin{pmatrix} -\omega^2 & -\dot{\omega}z & \dot{\omega}y \\ \dot{\omega}z & -\omega^2 & -\dot{\omega}x \\ -\dot{\omega}y & \dot{\omega}x & -\omega^2 \end{pmatrix}^{-1} A$$

Rs means a value represented as the positional relationship, A means a value represented as the motion component calculated by the motion component calculation means, and $\omega$ means a value of the angular velocity which is represented as the angular velocity data and is formed of three axis components of X, Y and Z axes perpendicularly crossing one another.

$\dot{\omega}x$ means a differential value of an X-axis component of the angular velocity, $\dot{\omega}y$ means a differential value of a Y-axis component of the angular velocity, and $\dot{\omega}z$ means a differential value of a Z-axis component of the angular velocity.

According to a computer readable storage medium having a game program stored thereon in these aspects, substantially the same effects as those of the game apparatus of the above-described aspects can be provided.

According to the present invention, the center of the rotation motion applied on the input device and the moving velocity can be estimated. Therefore, a game apparatus and a game program for allowing a game to be played with a novel operation can be provided.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a block diagram showing a structure of the controller 5 shown in

FIG. 3;

DESCRIPTION OF THE PREFERRED EMBODIMENTS

Hereinafter, exemplary embodiments of the present invention will be described with reference to the drawings. The present invention is not limited to these exemplary embodiments.

(Overall Structure of the Game System)

Figure 1:
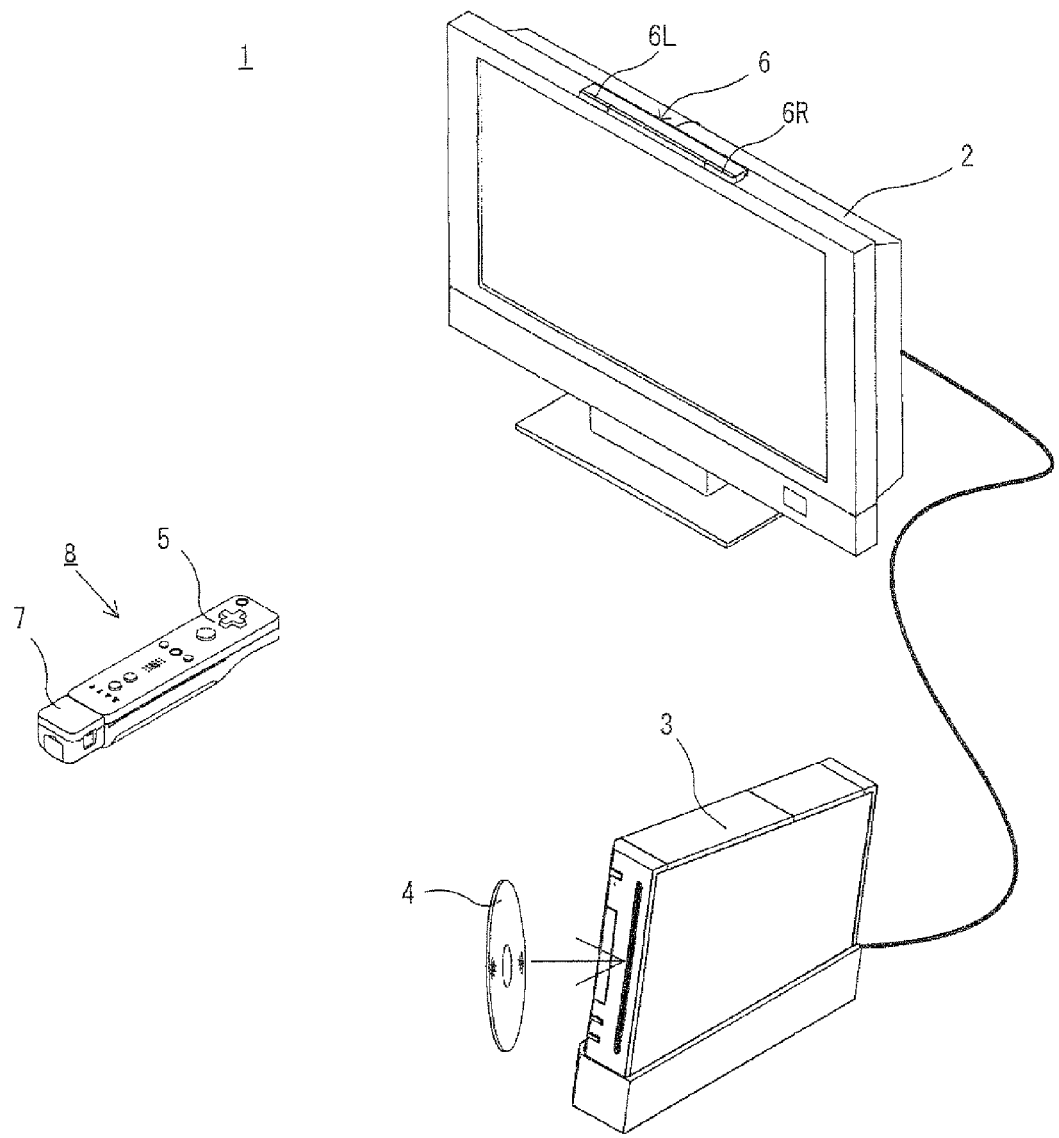
FIG. 1 is an external view showing a game system 1 according to one embodiment of the present invention.

With reference to FIG. 1, a game system 1 including a game apparatus, which is an example of a posture calculation device according to one exemplary embodiment of the present invention, will be described. FIG. 1 is an external view of the game system 1. Hereinafter, a game apparatus and a game program according to this embodiment will be described. In the following example, the game apparatus is of an installation type. As shown in FIG. 1, the game system 1 includes a television receiver 2 (hereinafter, referred to simply as a "TV") 2, a game apparatus 3, an optical disc 4, an input device 8, and a marker section 6. In the game system 1, game processing is executed by the game apparatus 3 based on a game operation performed using the input device 8.

In the game apparatus 3, the optical disc 4, which is an example of an information storage medium exchangeably usable for the game apparatus 3, is detachably inserted. The optical disc 4 has stored thereon a game program to be executed by the game apparatus 3. The game apparatus 3 has an insertion opening for inserting the optical disc 4 on a front surface thereof. The game apparatus 3 reads and executes the game program stored on the optical disc 4 inserted into the insertion opening, and thus performs the game processing.

The game apparatus 3 is connected to the TV 2, which is an example of a display device, via a connection cord. The TV 2 displays a game image obtained as a result of the game processing executed by the game apparatus 3. A marker section 6 is provided in the vicinity of a display screen of the TV 2 (above the display screen in FIG. 1). The marker section 6 includes two markers 6R and 6L respectively at two ends thereof. Specifically, the marker 6R (also the marker 6L) includes one or more infrared LEDs, and outputs infrared light forward from the TV 2. The marker section 6 is connected to the game apparatus 3, and the game apparatus 3 can control each of the infrared LEDs of the marker section 6 to be lit up or out.

The input device 8 provides the game apparatus 3 with operation data representing the particulars of the operation made thereon. In this embodiment, the input device 8 includes a controller 5 and a gyrosensor unit 7. As described later in detail, in the input device 8, the gyrosensor unit 7 is detachably connected to the controller 5. The controller 5 and the game apparatus 3 are connected with each other via wireless communication. In this embodiment, the controller 5 and the game apparatus 3 are wirelessly communicable to each other by, for example, the Bluetooth (registered trademark) technology. In other embodiments, the controller 5 and the game apparatus 3 may be connected with each other in a wired manner.

(Internal Structure of the Game Apparatus 3)

Figure 2:
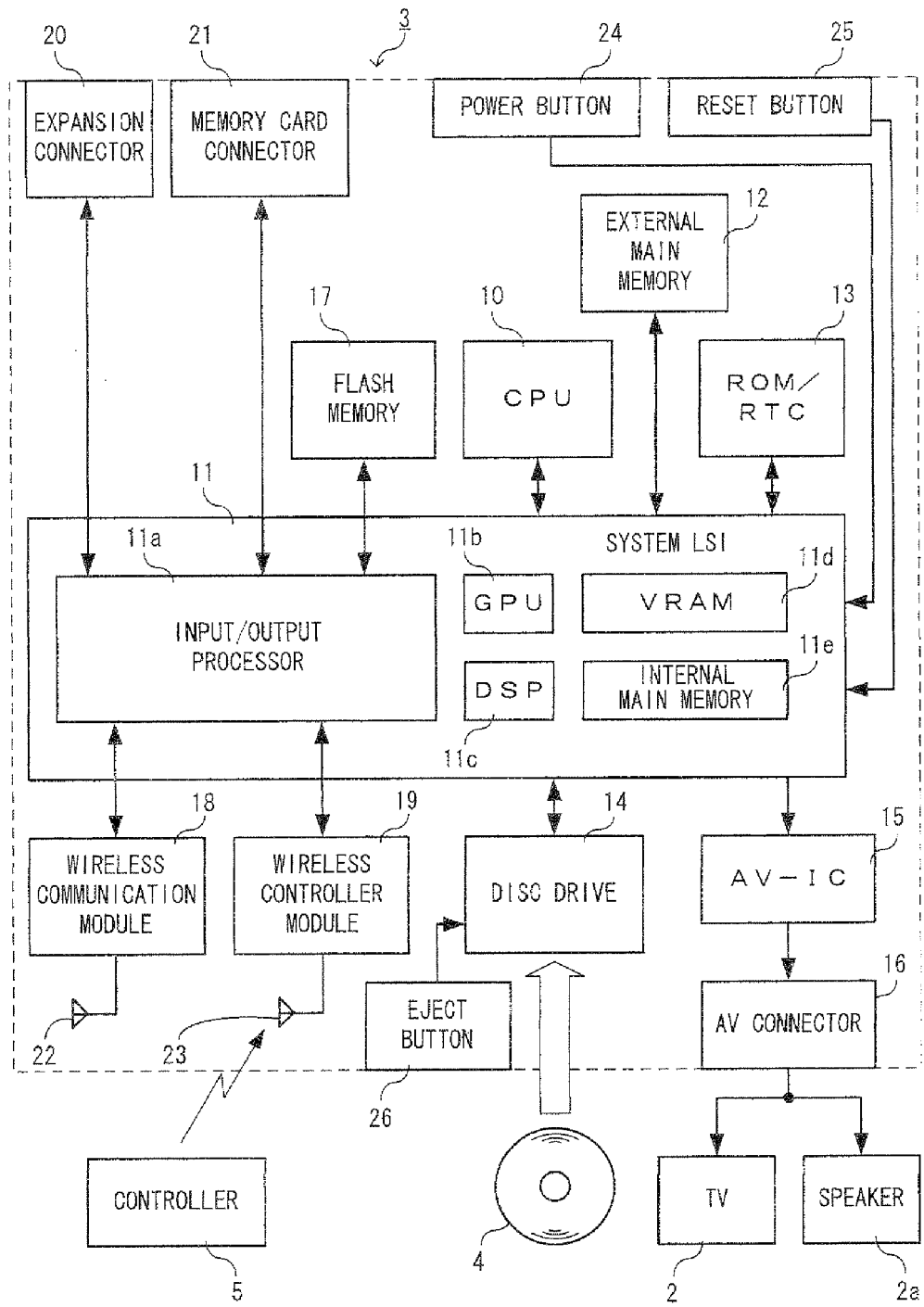
FIG. 2 is a functional block diagram of a game apparatus 3 shown in FIG. 1.

Next, with reference to FIG. 2, an internal structure of the game apparatus 3 will be described. FIG. 2 is a block diagram showing a structure of the game apparatus 3. The game apparatus 3 includes a CPU 10, a system LSI 11, an external main memory 12, a ROM/RTC 13, a disc drive 14, an AV-IC 15, and the like.

The CPU 10 performs the game processing by executing a game program stored on the optical disc 4, and acts as a game processor. The CPU 10 is connected to the system LSI 11. The system LSI 11 is connected to the CPU 10 and also to the external main memory 12, the ROM/RTC 13, the disc drive 14 and the AV-IC 15. The system LSI 11 performs the processing of, for example, controlling data transfer between the elements connected thereto, generating images to be displayed, and obtaining data from external devices. An internal structure of the system LSI 11 will be described later. The external main memory 12, which is of a volatile type, has stored thereon a program such as a game program read from the optical disc 4, a game program read from a flash memory 17 or the like, or various other data. The external main memory 12 is used as a work area or a buffer area of the CPU 10. The ROM/RTC 13 includes a ROM having a program for starting the game apparatus 3 incorporated thereon (so-called boot ROM) and a clock circuit for counting time (RTC: Real Time Clock). The disc drive 14 reads program data, texture data or the like from the optical disc 4 and writes the read data onto an internal main memory 11e described later or the external main memory 12.

The system LSI 11 includes an input/output processor (I/O processor) 11a, a GPU (Graphics Processor Unit) 11b, a DSP (Digital Signal Processor) 11c, a VRAM 11d, and the internal main memory 11e. Although not shown, these elements 11a through 11e are connected with each other via an internal bus.

The GPU 11b is a part of drawing means and generates an image in accordance with a graphics command (a command to draw an image) from the CPU 10. The VRAM 11d has stored thereon data necessary for the GPU 11b to execute the graphics command (polygon data, texture data or other data). The GPU 11b uses the data stored on the VRAM 11d to generate an image.

The DSP 11c acts as au audio processor and generates audio data using sound data or sound wave (sound tone) data stored on the internal main memory 11e or the external main memory 12.

The image data and the audio data generated as described above are read by the AV-IC 15. The AV-IC 15 outputs the read image data to the TV 2 via an AV connector 16, and outputs the read audio data to a speaker 2a built in the TV 2. Thus, the image is displayed on the TV 2 and also the sound is output from the speaker 2a.

The input/output processor 11a transmits or receives data to or from the elements connected thereto, or downloads data from external devices. The input/output processor 11a is connected to the flash memory 17, a wireless communication module 18, a wireless controller module 19, an expansion connector 20, and a memory card connector 21. The wireless communication module 18 is connected to an antenna 22, and the wireless controller module 19 is connected to an antenna 23.

The input/output processor 11a is connected to a network via the wireless communication module 18 and the antenna 22, and thus can communicate with other game apparatuses or various servers also connected to the network. The input/output processor 11a periodically accesses the flash memory 17, and detects whether or not there is data which needs to be transmitted to the network. When there is such data, the input/output processor 11a transmits such data to the network via the wireless communication module 18 and the antenna 22. The input/output processor 11a also receives data transmitted from other game apparatuses or data downloaded from a download server via the network, the antenna 22 and the wireless communication module 18, and stores the received data on the flash memory 17. The CPU 10 executes the game program and thus reads the data stored on the flash memory 17 to be used for the game program. The flash memory 17 may have stored therein data saved as a result of playing the game using the game apparatus 3 (data representing a result or a state in the middle of the game) as well as the data to be transmitted to, or data received from, the other game apparatuses or various servers.

The input/output processor 11a receives operation data which is transmitted from the controller 5 via the antenna 23 and the wireless controller module 19 and stores (temporarily stores) the operation data in a buffer area of the internal main memory 11e or the external main memory 12.

The input/output processor 11a is connected to the expansion connector 20 and the memory card connector 21. The expansion connector 20 is a connector for an interface such as USB, SCSI or the like. The expansion connector 20 may be connected to a medium such as an external storage medium or the like, may be connected to a peripheral device such as another controller or the like, or may be connected to a wired communication connector, to communicate with the network instead of the wireless communication module 18. The memory card connector 21 is a connector for an external storage medium such as a memory card or the like. For example, the input/output processor 11a can access an external storage medium via the expansion connector 20 or the memory card connector 21 to store data on the external storage medium or read data from the external storage medium.

The game apparatus 3 has a power button 24, a reset button 25, and an eject button 26. The power button 24 and the reset button 25 are connected to the system LSI 11. When the power button 24 is turned on, the elements of the game apparatus 3 are provided with power via an AC adaptor (not shown). When the reset button 25 is pressed, the system LSI 11 restarts a starting program of the game apparatus 3. The eject button 26 is connected to the disc drive 14. When the eject button 26 is pressed, the optical disc 4 is dismounted from the disc drive 14.

(Structure of the Input Device 8)

Figure 3:
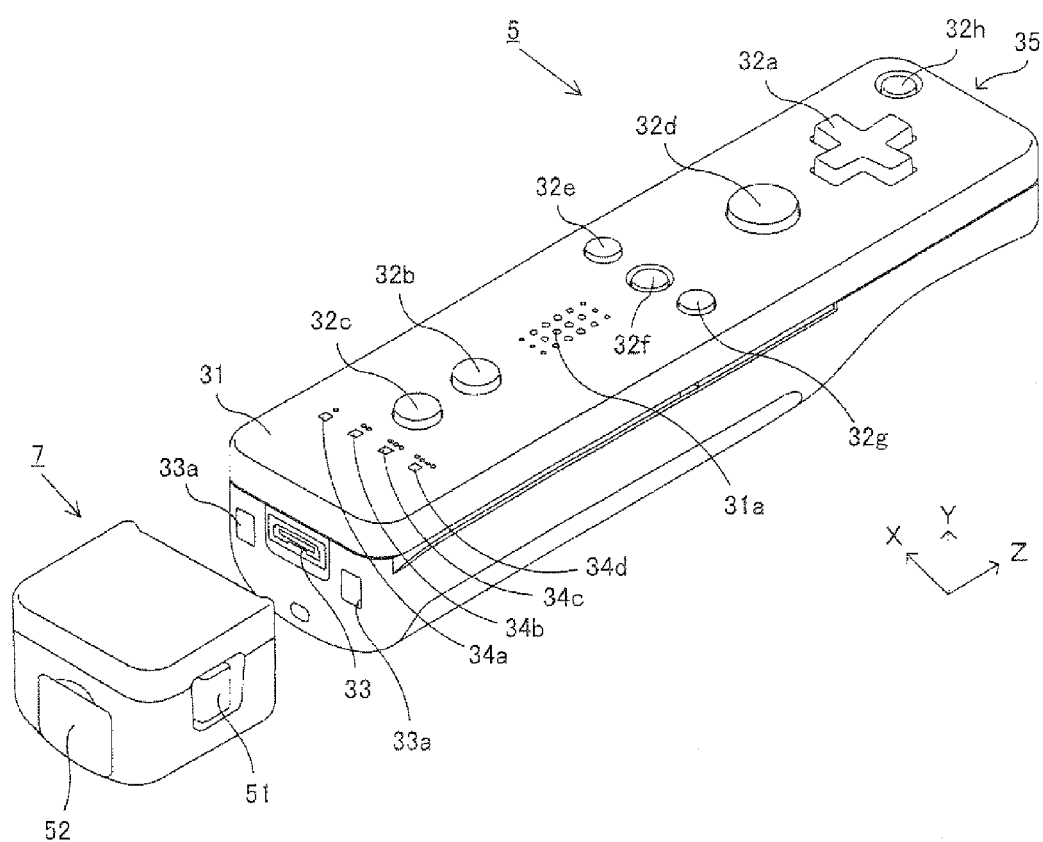
FIG. 3 is an isometric view of an input device 8 shown in FIG. 1 seen from the top rear side thereof.
Figure 4:
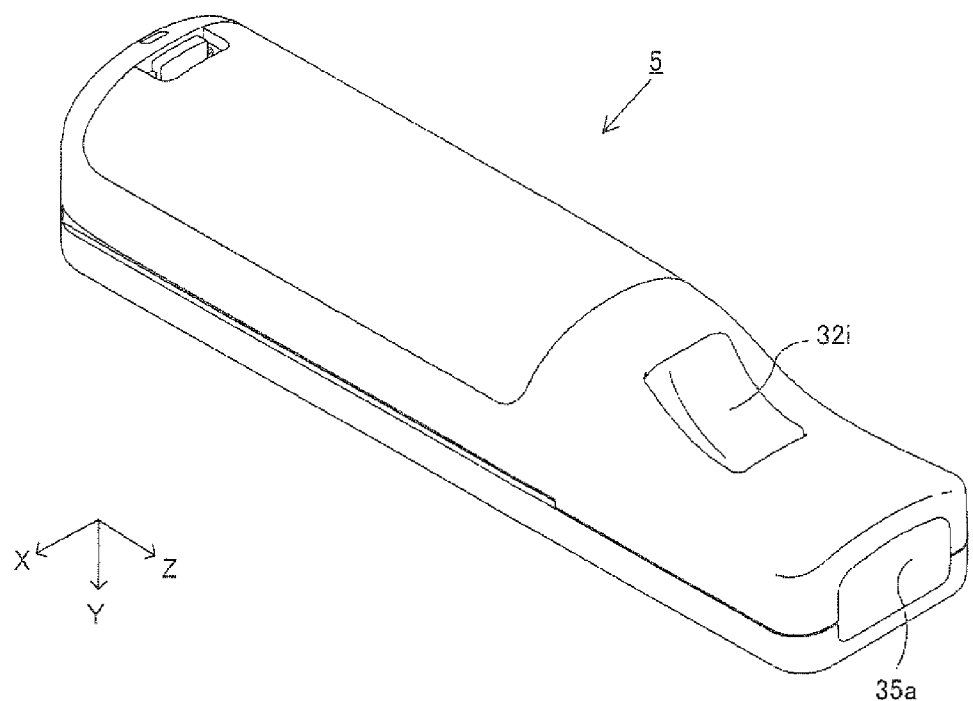
FIG. 4 is an isometric view of the controller 5 shown in FIG. 3 seen from the bottom front side thereof.

With reference to FIG. 3 through FIG. 6, the input device 8 will be described. FIG. 3 is an isometric view showing an external structure of the input device 8. FIG. 4 is an isometric view showing an external structure of the controller 5. FIG. 3 is an isometric view of the input device 8 seen from the top rear side thereof. FIG. 4 is an isometric view of the controller 5 seen from the bottom front side thereof.

As shown in FIG. 3 and FIG. 4, the controller 5 includes a housing 31 formed by, for example, plastic molding. The housing 31 has a generally parallelepiped shape extending in a longitudinal or front-rear direction (Z-axis direction shown in FIG. 3). The overall size of the housing 31 is small enough to be held by one hand of an adult or even a child. A player can perform a game operation by, for example, pressing buttons provided in the controller 5 or moving the controller 5 itself to change the position or posture thereof.

The housing 31 has a plurality of operation buttons. As shown in FIG. 3, provided on a top surface of the housing 31 are a cross button 32a, a first button 32b, a second button 32c, an A button 32d, a minus button 32e, a home button 32f, a plus button 32g, and a power button 32h. In this specification, the top surface on which these buttons 32a through 32h are provided will be occasionally referred to as the "button surface". As shown in FIG. 4, a recessed portion is formed on a bottom surface of the housing 31, and a B button 32i is provided on a slope surface of the recessed portion. The operation buttons 32a through 32i are assigned various functions in accordance with the game program executed by the game apparatus 3. The power button 32h is for remote-controlling the power of the main body of the game apparatus 3 to be on or off. The home button 32f and the power button 32h have a top surface thereof buried in the top surface of the housing 31, so as not to be inadvertently pressed by the player.

On a rear surface of the housing 31, a connector 33 is provided. The connector 33 is used for connecting the controller 5 with another device (for example, the gyrosensor unit 7 or another controller). On both sides of the connector 33 on the rear surface of the housing 31, engagement holes 33a are provided for preventing such another device from easily coming off.

In a rear part of the top surface of the housing 31, a plurality of LEDs (in FIG. 3, four LEDs) 34a through 34d are provided. The controller 5 is assigned a controller type (number) so as to be distinguishable from other main controllers. The LEDs 34a through 34d are used for, for example, informing the player of the controller type which is currently set to the controller 5 that he/she is using, or for informing the player of the remaining battery amount. Specifically, when the controller 5 is used for the game operation, one of the plurality of LEDs 34a through 34d corresponding to the controller type is lit up.

Figure 6:
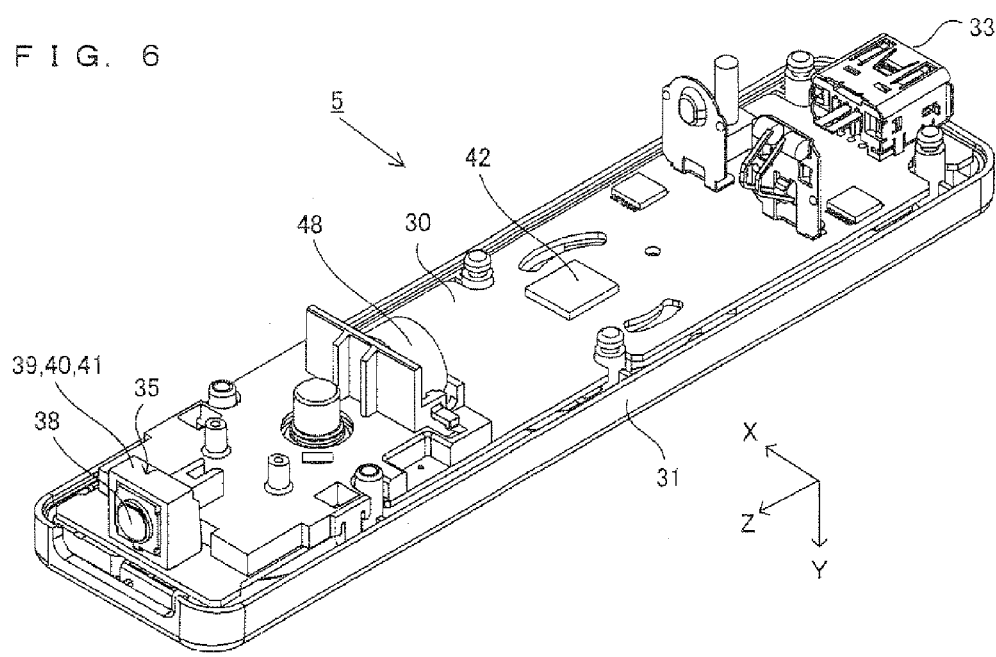
FIG. 6 is an isometric view of the controller 5 shown in FIG. 3 in a state where a lower casing thereof is removed.

The controller 5 includes an imaging information calculation section 35 (FIG. 6). As shown in FIG. 4, a light incident face 35a of the imaging information calculation section 35 is provided on a front surface of the housing 31. The light incident face 35a is formed of a material which allows infrared light from the markers 6R and 6L to be at least transmitted therethrough.

On the top surface of the housing 31, sound holes 31a are formed between the first button 32b and the home button 32f for releasing the sound outside from a speaker 49 (FIG. 5) built in the controller 5.

Figure 5:
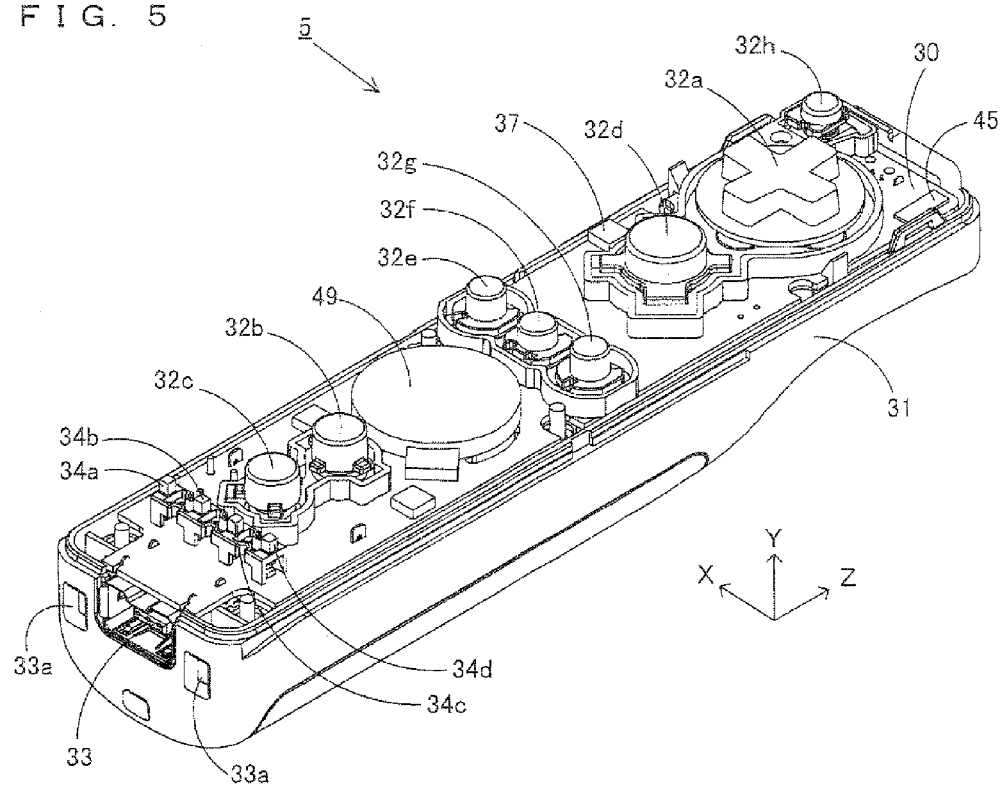
FIG. 5 is an isometric view of the controller 5 shown in FIG. 3 in a state where an upper casing thereof is removed.

Now, with reference to FIG. 5 and FIG. 6, an internal structure of the controller 5 will be described. FIG. 5 and FIG. 6 illustrate an internal structure of the controller 5. FIG. 5 is an isometric view illustrating a state where an upper casing (a part of the housing 31) of the controller 5 is removed. FIG. 6 is an isometric view illustrating a state where a lower casing (a part of the housing 31) of the controller 5 is removed. FIG. 6 shows a reverse side of a substrate 30 shown in FIG. 5.

As shown in FIG. 5, the substrate 30 is fixed inside the housing 31. On a top main surface of the substrate 30, the operation buttons 32a through 32h, the LEDs 34a through 34d, an acceleration sensor 37, an antenna 45, the speaker 49 and the like are provided. These elements are connected to a microcomputer 42 (see FIG. 6) via lines (not shown) formed on the substrate 30 and the like. In this embodiment, the acceleration sensor 37 is provided off the center line of the controller 5 along an X-axis direction. This makes it easier to calculate the motion of the controller 5 when the controller 5 is rotated around the Z axis. The acceleration sensor 37 is also located forward with respect to the center of the controller 5 along the longitudinal direction thereof (Z-axis direction). The provision of a wireless module 44 (FIG. 7) and the antenna 45 allows the controller 5 to act as a wireless controller.

As shown in FIG. 6, at a front edge of a bottom main surface of the substrate 30, the imaging information calculation section 35 is provided. The imaging information calculation section 35 includes an infrared filter 38, a lens 39, an imaging element 40 and an image processing circuit 41 located in this order from the front surface of the controller 5. These elements 38 through 41 are attached to the bottom main surface of the substrate 30.

On the bottom main surface of the substrate 30, the microcomputer 42 and a vibrator 48 are provided. The vibrator 48 may be, for example, a vibration motor or a solenoid, and is connected to the microcomputer 42 via lines provided on the substrate 30 and the like. The controller 5 is vibrated by an actuation of the vibrator 48 based on an instruction from the microcomputer 42, and the vibration is conveyed to the hand of the player holding the controller 5. Thus, a so-called vibration-responsive game is realized. In this embodiment, the vibrator 48 is located slightly forward with respect to the center of the housing 31. Since the vibrator 48 is provided closer to a front end than the center of the controller 5, the vibration of the vibrator 48 can vibrate the entire controller 5 more significantly. The connector 33 is attached at a rear edge of the main bottom surface of the substrate 30. In addition to the elements shown in FIG. 5 and FIG. 6, the controller 5 includes a quartz oscillator for generating a reference clock of the microcomputer 42, an amplifier for outputting an audio signal to the speaker 49, and the like.

The gyrosensor unit 7 includes gyrosensors (gyrosensors 55 and 56 shown in FIG. 7) for sensing an angular velocity around the three axes. The gyrosensor unit 7 is detachably attached on the connector 33 of the controller 5. At a front end of the gyrosensor unit 7 (an end thereof in a positive Z-axis direction shown in FIG. 3), a plug (a plug 53 shown in FIG. 7) connectable to the connector 33 is provided. On both sides of the plug 53, hooks (not shown) are provided. In the state where the gyrosensor unit 7 is attached to the controller 5, the plug 53 is connected to the connector 33 and the hooks are engaged with the engagement holes 33a of the controller 5. Thus, the controller 5 and the gyrosensor unit 7 are firmly secured to each other. The gyrosensor unit 7 also includes buttons 51 on side surfaces thereof (side surfaces perpendicular to the X-axis direction shown in FIG. 3). The buttons 51 are structured so as to release the hooks from the engagement holes 33a when being pressed. By pulling the plug 53 from the connector 33 while pressing the buttons 51, the gyrosensor unit 7 can be detached from the controller 5.

At a rear end of the gyrosensor unit 7, a connector having the same shape as that of the connector 33 is provided. Therefore, other devices attachable to the controller 5 (the connector 33 of the controller 5) can be attached to the connector of the gyrosensor unit 7. In FIG. 3, a cover 52 is detachably attached to the connector of the gyrosensor unit 7.

The shape of the controller 5 and the gyrosensor unit 7, the shape, number and position of the operation buttons, the acceleration sensor and the vibrator, and the like shown in FIG. 3 through FIG. 6 are merely exemplary, and may be altered without departing from the scope of the present invention. In this embodiment, the imaging direction of the imaging means is the positive Z-axis direction, but the imaging direction may be any direction. Specifically, the position of the imaging information calculation section 35 (the light incident face 35a of the imaging information calculation section 35) in the controller 5 does not need to be on the front surface of the housing 31, and may be on another surface as long as light can enter from the outside of the housing 31.

Figure 7:
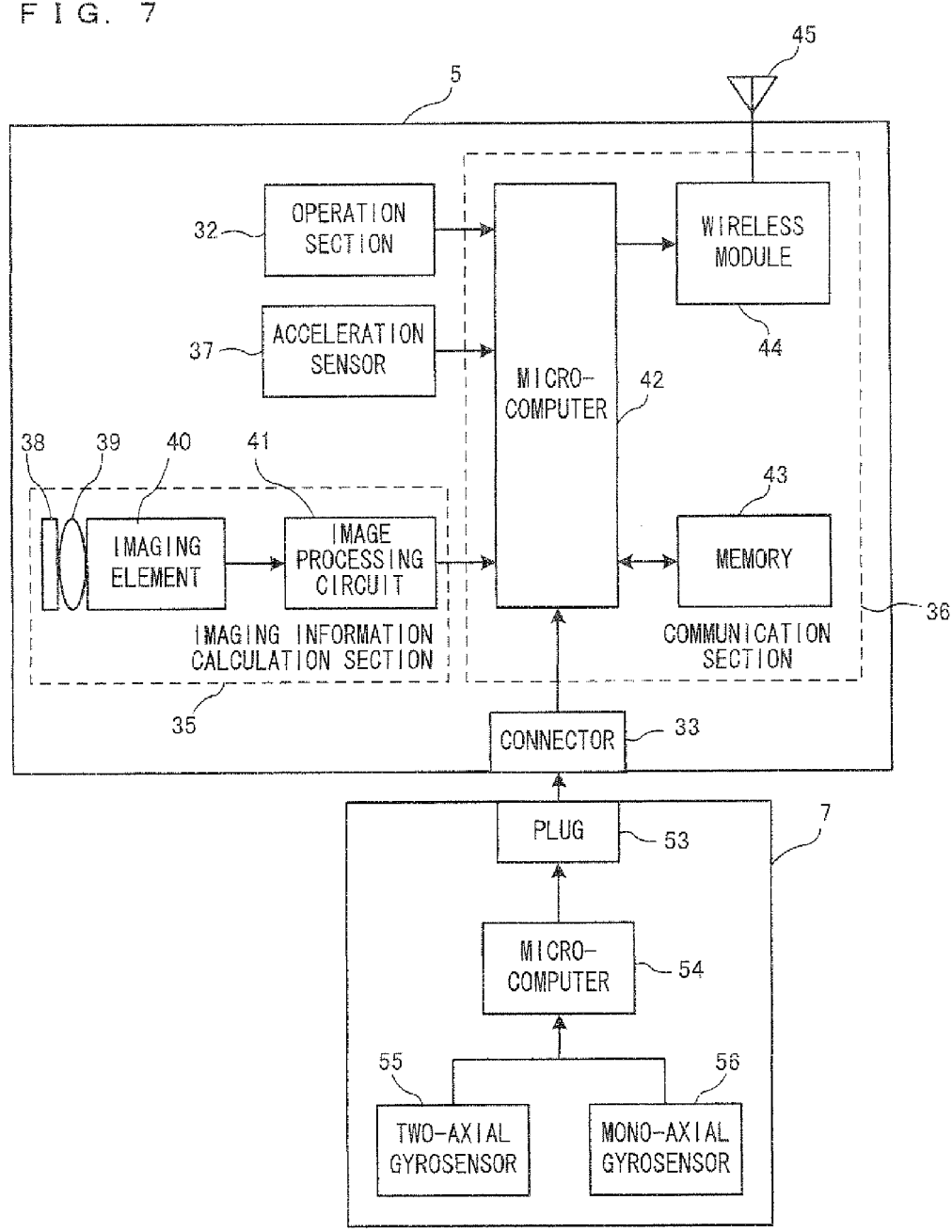

FIG. 7 is a block diagram showing a structure of the input device 8 (the controller 5 and the gyrosensor unit 7). The controller 5 includes the operation section 32 (operation buttons 32a through 32i), the connector 33, the imaging information calculation section 35, a communication section 36, and the acceleration sensor 37. The controller 5 transmits operation data representing the particulars of the operation made thereon to the game apparatus 3 as operation data.

The operation section 32 includes the above-described operation buttons 32a through 32i, and outputs operation button data representing an input state of each of the operation buttons 32a through 32i (whether each of the operation buttons 32a through 32i has been pressed or not) to the microcomputer 42 of the communication section 36.

The imaging information calculation section 35 is a system for analyzing image data taken by the imaging means, distinguishing an area having a high brightness in the image data, and calculating the center of gravity, the size and the like of the area. The imaging information calculation section 35 has, for example, a maximum sampling cycle of about 200 frames/sec., and therefore can trace and analyze even a relatively fast motion of the controller 5.

The imaging information calculation section 35 includes the infrared filter 38, the lens 39, the imaging element 40 and the image processing circuit 41. The infrared filter 38 allows only infrared light to pass therethrough, among light incident on the front surface of the controller 5. The lens 39 collects the infrared light which has been transmitted through the infrared filter 38 and causes the infrared light to be incident on the imaging element 40. The imaging element 40 is a solid-state imaging device such as, for example, a CMOS sensor or a CCD sensor. The imaging element 40 receives the infrared light collected by the lens 39 and outputs an image signal. The markers 6R and 6L of the marker section 6 located in the vicinity of the screen of the TV 2 each include an infrared LED for outputting infrared light forward from the TV 2. The provision of the infrared filter 38 allows the imaging element 40 to receive only the infrared light transmitted through the infrared filter 38 to generate image data. Therefore, the image of each of the markers 6R and 6L can be taken more accurately. Hereinafter, an image taken by the imaging element 40 will be referred to as a "taken image". The image data generated by the imaging element 40 is processed by the image processing circuit 41. The image processing circuit 41 calculates the positions of imaging targets (the markers 6R and 6L) in the taken image. The image processing circuit 41 outputs a coordinate representing the calculated position to the microcomputer 42 of the communication section 36. The data on the coordinate is transmitted by the microcomputer 42 to the game apparatus 3 as operation data. Hereinafter, this coordinate will be referred to as a "marker coordinate". The marker coordinate changes in accordance with the direction (inclining angle) or the position of the controller 5 itself, and therefore the game apparatus 3 can calculate the direction or the position of the controller 5 using the marker coordinate.

In other embodiments, the controller 5 does not need to include the image processing circuit 41, and a taken image itself may be transmitted from the controller 5 to the game apparatus 3. In this case, the game apparatus 3 may include a circuit or program having substantially the same function as that of the image processing circuit 41 and calculate the marker coordinate.

The acceleration sensor 37 detects an acceleration (including a gravitational acceleration) of the controller 5. Namely, the acceleration sensor 37 detects a force (including the force of gravity) applied to the controller 5. The acceleration sensor 37 detects a value of the acceleration in a linear direction along a sensing axis (linear acceleration) among accelerations acting on a detection section of the acceleration sensor 37. For example, in the case of a multi-axial (at least two-axial) acceleration sensor, an acceleration component along each axis is detected as an acceleration acting on the detection section of the acceleration sensor. For example, a three-axial or two-axial acceleration sensor may be of a type available from Analog Devices, Inc. or STMicroelectronics N.V. The acceleration sensor 37 is, for example, of an electrostatic capacitance type, but may be of any other system.

In this embodiment, the acceleration sensor 37 detects a linear acceleration in each of an up-down direction with respect to the controller 5 (Y-axis direction shown in FIG. 3), a left-right direction with respect to the controller 5 (X-axis direction shown in FIG. 3), and a front-rear direction with respect to the controller 5 (Z-axis direction shown in FIG. 3).

Since the acceleration sensor 37 detects an acceleration in the linear direction along each axis, the output from the acceleration sensor 37 represents a value of the linear acceleration along each of the three axes. Namely, the detected acceleration is represented as a three-dimensional vector (ax, ay, az) in an XYZ coordinate system (controller coordinate system) which is set with respect to the input device (controller 5). Hereinafter, a vector having, as components, acceleration values along the three axes detected by the acceleration sensor 37 will be referred to as the "acceleration vector".

Data representing the acceleration detected by the acceleration sensor 37 (acceleration data) is output to the communication section 36. Since the acceleration detected by the acceleration sensor 37 changes in accordance with the direction (inclining angle) or the motion of the controller 5 itself, the game apparatus 3 can calculate the direction or the motion of the controller 5 using the acceleration data. In this embodiment, the game apparatus 3 calculates the posture of the controller 5 based on the acceleration data.

Data (acceleration data) representing the acceleration detected by the acceleration sensor 37 (acceleration vector) is output to the communication section 36. In this embodiment, the acceleration sensor 37 is used as a sensor for outputting data for determining the inclining angle of the controller 5.

A computer such as a processor of the game apparatus 3 (for example, the CPU 10) or a processor of the controller 7 (for example, the microcomputer 42) executes processing based on an acceleration signal which is output from the acceleration sensor 37, and as a result, can estimate or calculate (determine) further information on the controller 5. A person of ordinary skill in the art would easily understand this from the description of this specification. For example, when the computer executes processing with a premise that the controller 5 including the acceleration sensor 37 is in a static state (i.e., when the computer executes processing with a premise that the acceleration detected by the acceleration sensor 37 includes only a gravitational acceleration), if the controller 5 is actually in a static state, it can be found based on the detected acceleration whether or not the posture of the controller 5 is inclined with respect to the direction of gravity, or how much the posture of the controller 5 is inclined with respect to the direction of gravity. Specifically, where the state in which a detection axis of the acceleration sensor 37 is directed vertically downward is a reference state, it can be found whether or not the controller 5 is inclined with respect to the reference state based on whether or not 1 G (gravitational acceleration) is applied to the controller 5. Based on the magnitude of the gravitational acceleration, it can also be found how much the controller 5 is inclined with respect to the reference state. In the case of a multi-axial acceleration sensor 37, it can be found more precisely how much the controller 5 is inclined with respect to the direction of gravity by processing a signal representing an acceleration along each axis. In this case, the processor may calculate the inclining angle of the controller 5 based on an output from the acceleration sensor 37, or may calculate the inclining angle of the controller 5 without calculating the inclining angle. By using the acceleration sensor 37 in combination with a processor in this manner, the inclining angle or posture of the controller 5 can be determined.

By contrast, with a premise that the controller 5 is in a dynamic state (in the state where the controller 5 is being moved), the acceleration sensor 37 detects an acceleration in accordance with the motion of the controller 5 in addition to the gravitational acceleration. Therefore, the moving direction of the controller 5 can be found by removing a component of the gravitational acceleration from the detected acceleration using predetermined processing. Even with the premise that the controller 5 is in a dynamic state, the inclination of the controller 5 with respect to the direction of gravity can be found by removing a component of the acceleration in accordance with the motion of the acceleration sensor from the detected acceleration using predetermined processing. In other embodiments, the acceleration sensor 37 may include an incorporated processing device or other types of dedicated device for executing predetermined processing on an acceleration signal detected by built-in acceleration detection means before the detected acceleration signal is output to the microcomputer 42. In the case where the acceleration sensor 37 is used for, for example, detecting a static acceleration (for example, a gravitational acceleration), the incorporated or dedicated processing device may be of a type for converting the acceleration signal into an inclining angle (or any other preferable parameter).

The communication section 36 includes the microcomputer 42, a memory 43, the wireless module 44 and the antenna 45. The microcomputer 42 controls the wireless module 44 for wirelessly transmitting the data obtained by the microcomputer 42 to the game apparatus 3 while using the memory 43 as a storage area during processing. The microcomputer 42 is connected to the connector 33. Data transmitted from the gyrosensor unit 7 is input to the microcomputer 42 via the connector 33. Hereinafter, the gyrosensor unit 7 will be described.

The gyrosensor unit 7 includes the plug 53, a microcomputer 54, the two-axial gyrosensor 55 and the mono-axial gyrosensor 56. As described above, the gyrosensor unit 7 detects an angular velocity around three axes (in this embodiment, the X, Y and Z axes) and transmits data representing each detected angular velocity (angular velocity data) to the controller 5.

Figure 8:
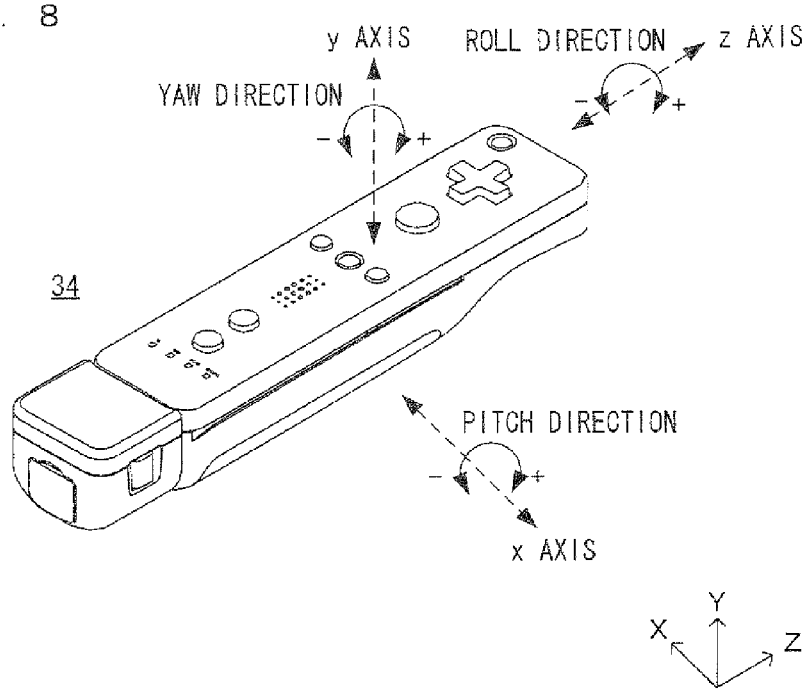
FIG. 8 shows directions of angular velocity in this embodiment.

The two-axial gyrosensor 55 detects an angular velocity (per unit time) around the X axis and an angular velocity around the Y axis (per unit time). The mono-axial gyrosensor 56 detects an angular velocity around the Z axis (per unit time). In this specification, with respect to the imaging direction of the controller 5 (the positive Z-axis direction), the rotation directions around the X, Y and Z axes will be referred to as the "pitch direction", the "yaw direction" and "roll direction", respectively. Namely, the two-axial gyrosensor 55 detects the angular velocity in the pitch direction (rotation direction around the X axis) and the yaw direction (rotation direction around the Y axis), and the mono-axial gyrosensor 56 detects the angular velocity in the roll direction (rotation direction around the Z axis) (see FIG. 8).

In this embodiment, the two-axial gyrosensor 55 and the mono-axial gyrosensor 56 are used in order to detect the angular velocity around the three axes. In other embodiments, the number and combination of the gyrosensors to be used are not specifically limited as long as the angular velocity around the three axes can be detected.

In this embodiment, for the purpose of facilitating calculations in posture calculation processing described later, the three axes around which the gyrosensors 55 and 56 detect the angular velocity are set to match the three axes along which the acceleration sensor 37 detects the acceleration (X, Y and Z axes). In other embodiments, the three axes around which the gyrosensors 55 and 56 detect the angular velocity do not need to match the three axes along which the acceleration sensor 37 detects the acceleration.

Data representing the angular velocity detected by each of the gyrosensors 55 and 56 is output to the microcomputer 54. Accordingly, data representing the angular velocity around the three axes, i.e., the X, Y and Z axes is input to the microcomputer 54. The microcomputer 54 transmits the data representing the angular velocity around the three axes as the angular velocity data to the controller 5 via the plug 53. The transmission from the microcomputer 54 to the controller 5 is performed at a predetermined cycle. Since game processing is generally performed at a cycle of 1/60 sec. (at a cycle of frame time), the transmission is preferably performed at a cycle of a time period equal to or shorter than 1/60 sec.

Now, the description of the controller 5 will be resumed. Data which is output from the operation section 32, the imaging information calculation section 35, and the acceleration sensor 37 to the microcomputer 42, and data transmitted from the gyrosensor unit 7 to the microcomputer 42, are temporarily stored on the memory 43. Such data is transmitted to the game apparatus 3 as the operation data. Namely, at the transmission timing to the wireless controller module 19 of the game apparatus 3, the microcomputer 42 outputs the operation data stored on the memory 43 to the wireless module 44. The wireless module 44 modulates a carrier wave of a predetermined frequency with the operation data and radiates the resultant very weak radio signal from the antenna 45, using, for example, the Bluetooth (registered trademark) technology. Namely, the operation data is modulated into a very weak radio signal by the wireless module 44 and transmitted from the controller 5. The very weak radio signal is received by the wireless controller module 19 on the side of the game apparatus 3. The received very weak radio signal is demodulated or decoded, and thus the game apparatus 3 can obtain the operation data. The CPU 10 of the game apparatus 3 executes the game processing based on the obtained operation data and the game program. The wireless communication from the communication section 36 to the wireless controller module 19 is performed at a predetermined cycle. Since game processing is generally performed at a cycle of 1/60 sec. (at a cycle of frame time), the wireless transmission is preferably performed at a cycle of a time period equal to or shorter than 1/60 sec. The communication section 36 of the controller 5 outputs each piece of the operation data to the wireless controller module 19 of the game apparatus 3 at rate of, for example, once in 1/200 seconds.

By using the controller 5, the player can perform an operation of inclining the controller 5 at an arbitrary inclining angle, in addition to a conventional general game operation of pressing the operation buttons. With the controller 5 described above, the player can also perform an operation of indicating an arbitrary position on the screen by the controller 5 and also an operation of moving the controller 5 itself.

Figure 9:
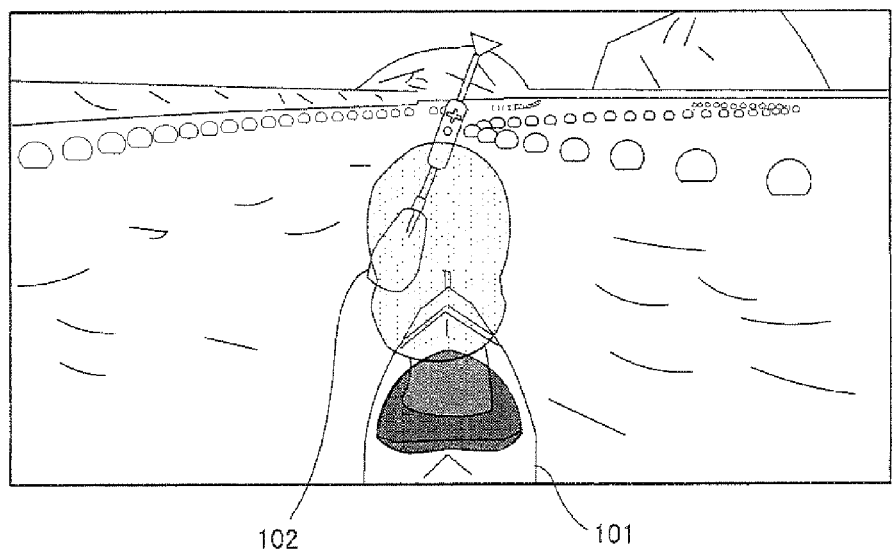
FIG. 9 shows an exemplary game screen assumed in this embodiment.
Figure 10:
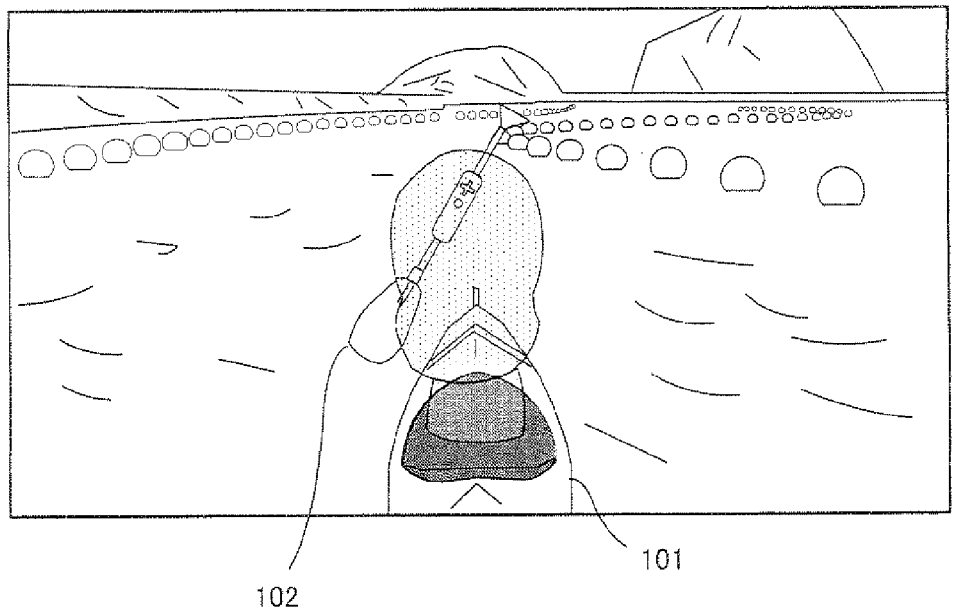
FIG. 10 shows an exemplary game screen assumed in this embodiment.
Figure 11:
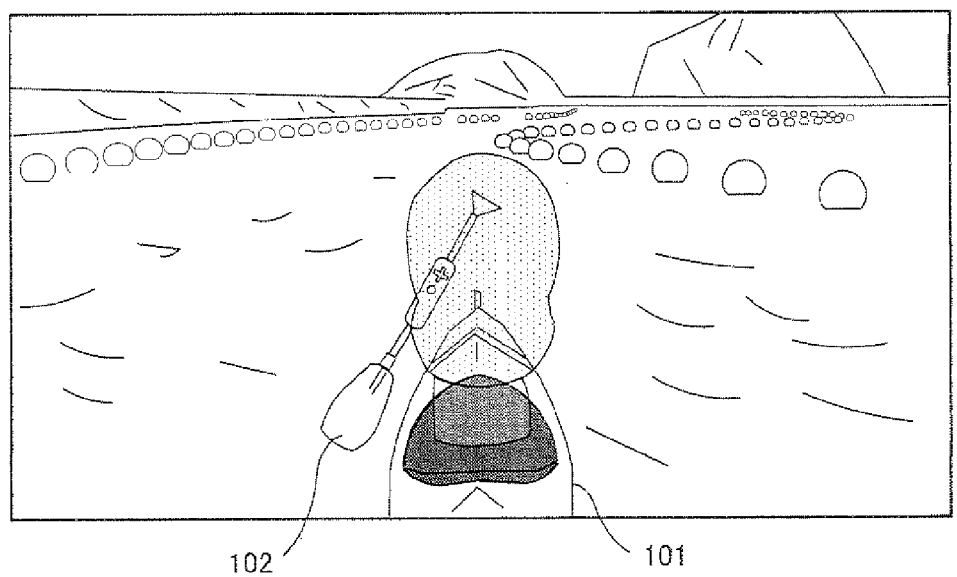
FIG. 11 shows an exemplary game screen assumed in this embodiment.

Now, with reference to FIG. 9 through FIG. 12, an overview of a game assumed in this embodiment will be described. The game assumed in this embodiment uses canoe as a material. FIG. 9 shows an exemplary game screen assumed in this embodiment. In FIG. 9, the game screen displays a player object 101 on a canoe (for one person) and a paddle 102 for paddling a canoe (single blade paddle). In this game, the player uses the input device 8 as if the input device 8 was a paddle of the canoe (more accurately, a grasp of the paddle) and moves the input device 8 as if paddling the canoe (paddling through the water). Thus, as shown in FIG. 9 through FIG. 12, the paddle 102 in the game screen is also moved. The player can paddle through the water in a virtual game space to move the canoe in this manner, and thus can enjoy pseudo canoeing.

Figure 13:
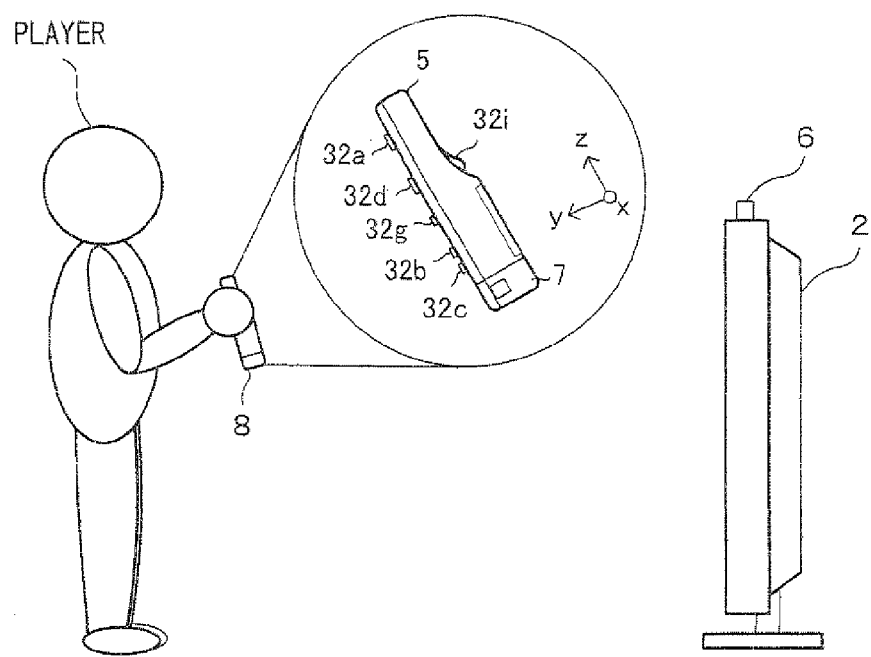
FIG. 13 is a schematic view showing an exemplary paddling operation.
Figure 14:
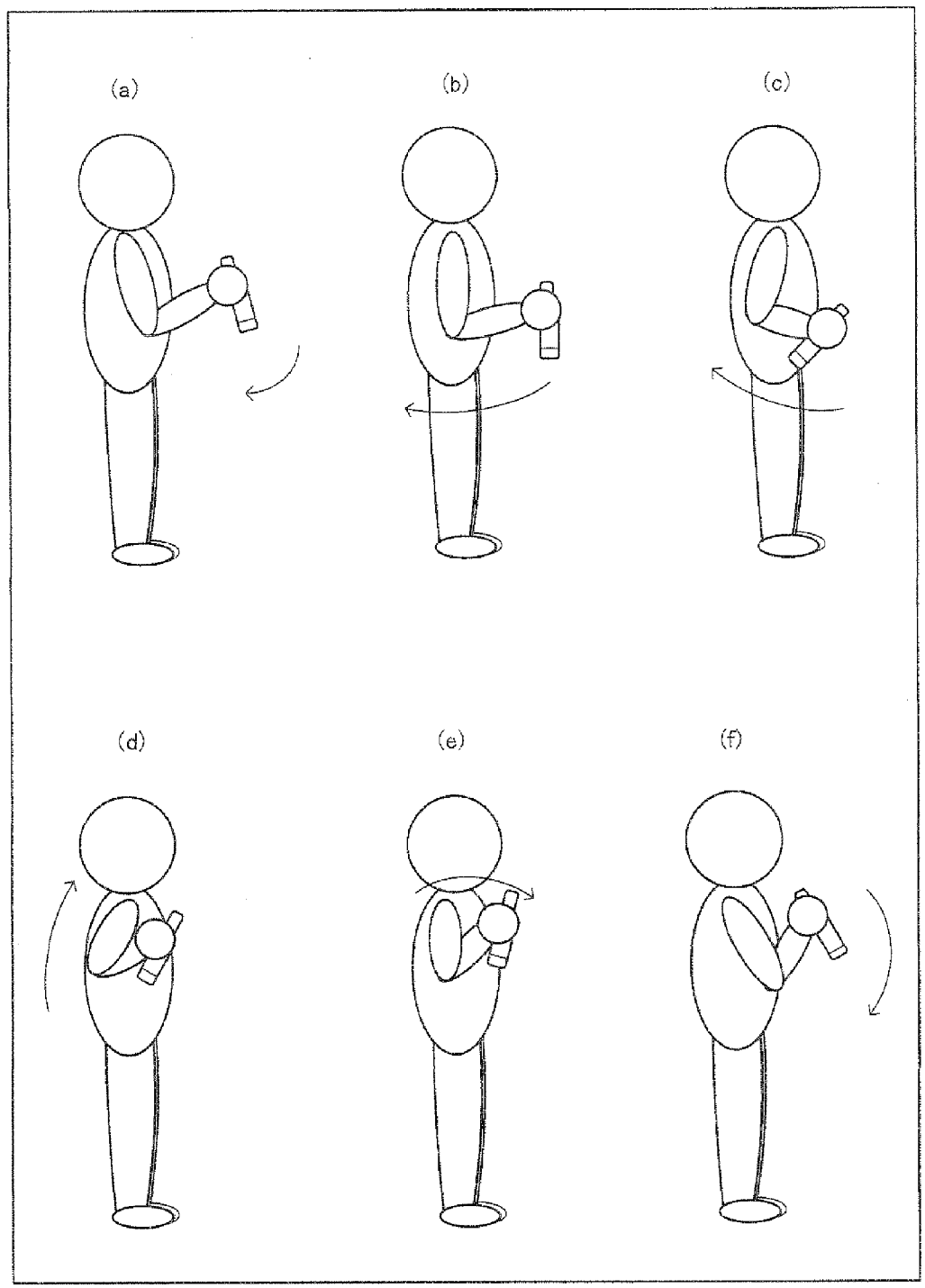
FIG. 14 is a schematic view showing an exemplary paddling operation.
Figure 15:
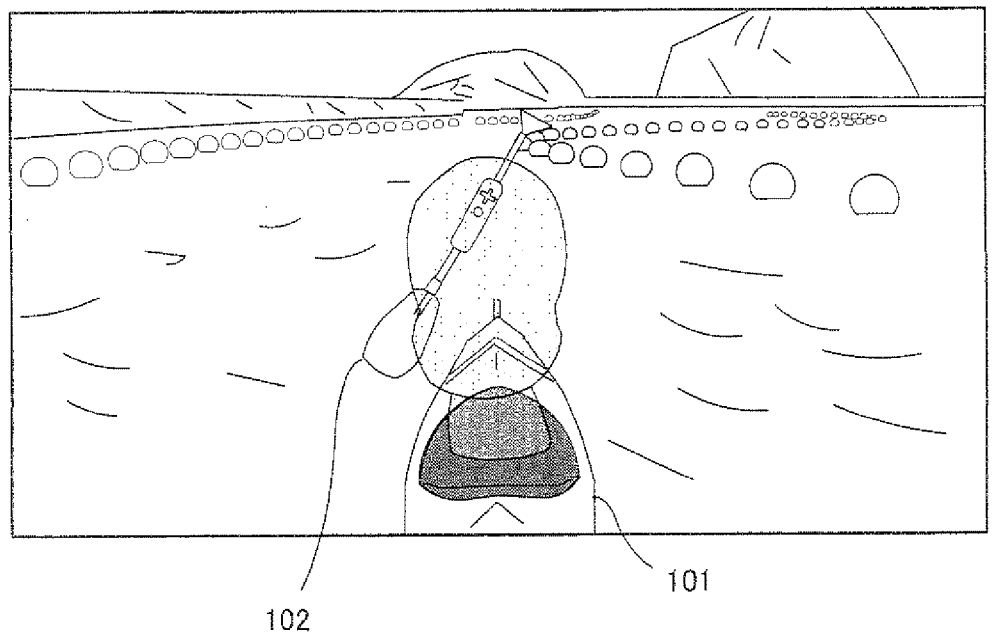
FIG. 15 shows an exemplary game screen assumed in this embodiment.
Figure 16:
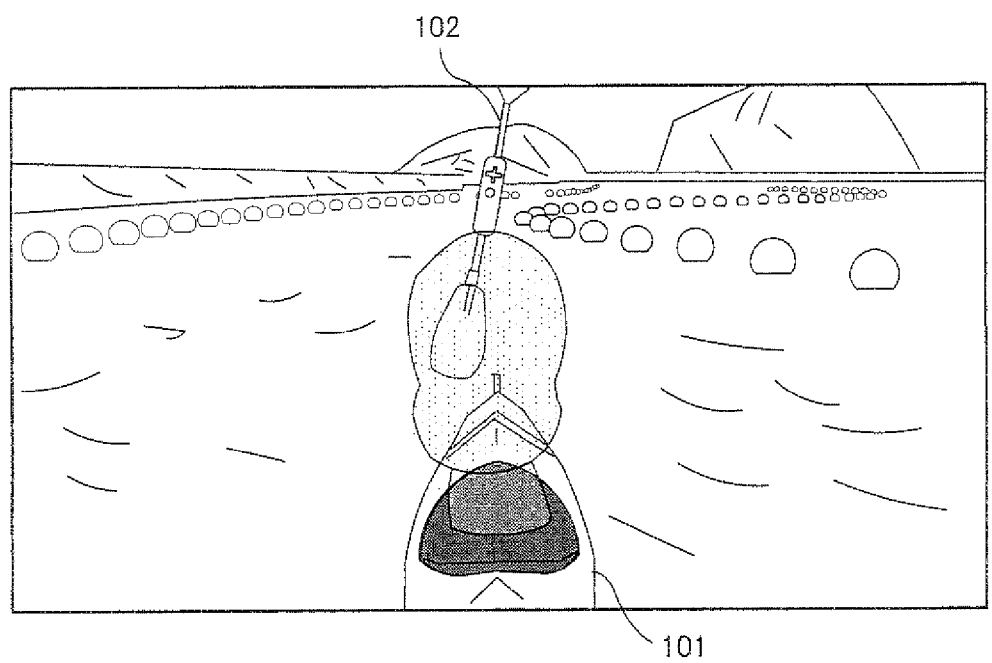
FIG. 16 shows an exemplary game screen assumed in this embodiment.
Figure 17:
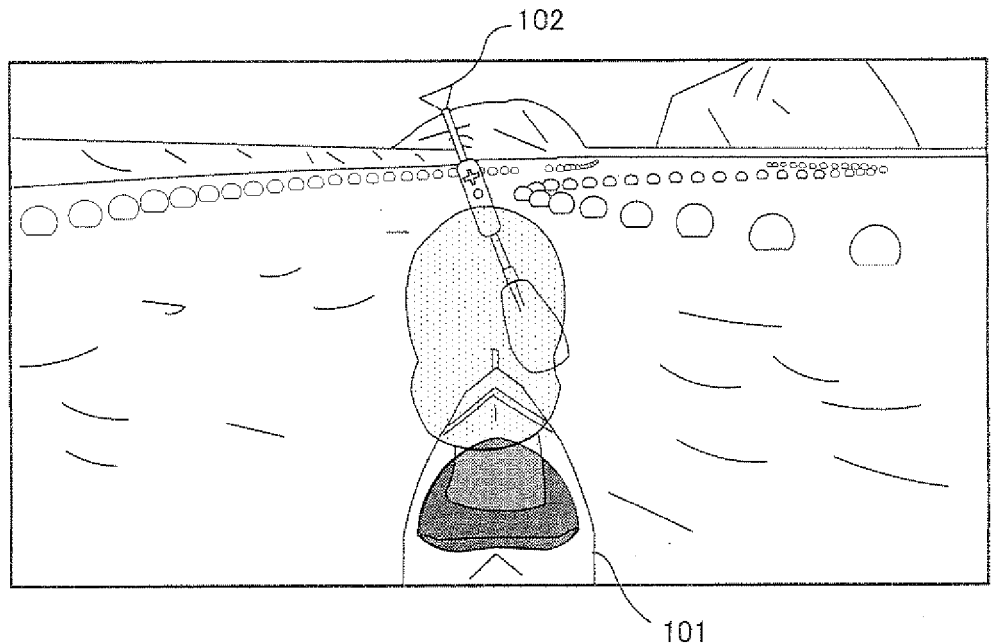
FIG. 17 shows an exemplary game screen assumed in this embodiment.
Figure 18:
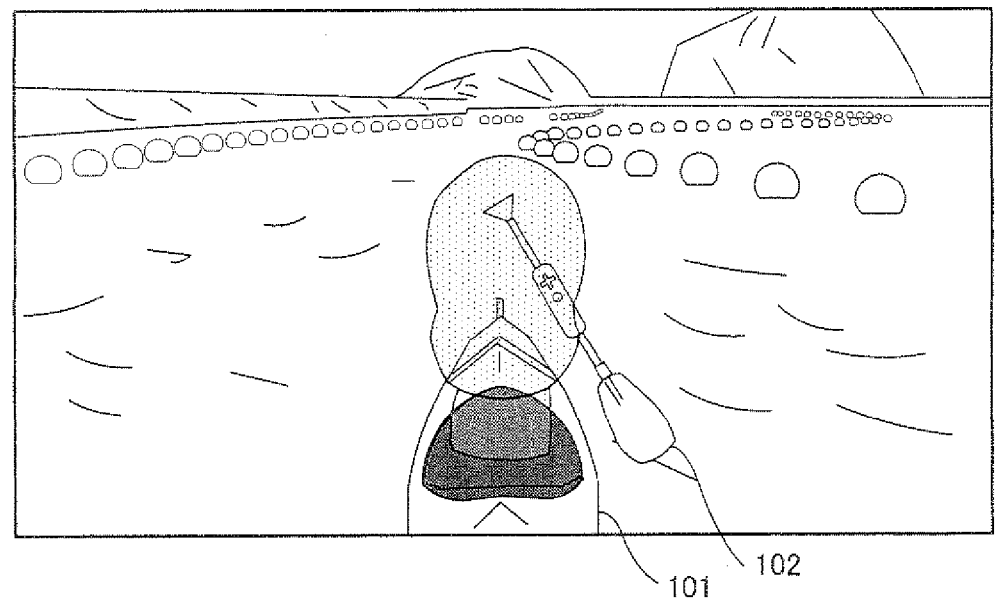
FIG. 18 shows an exemplary game screen assumed in this embodiment.
Figure 19:
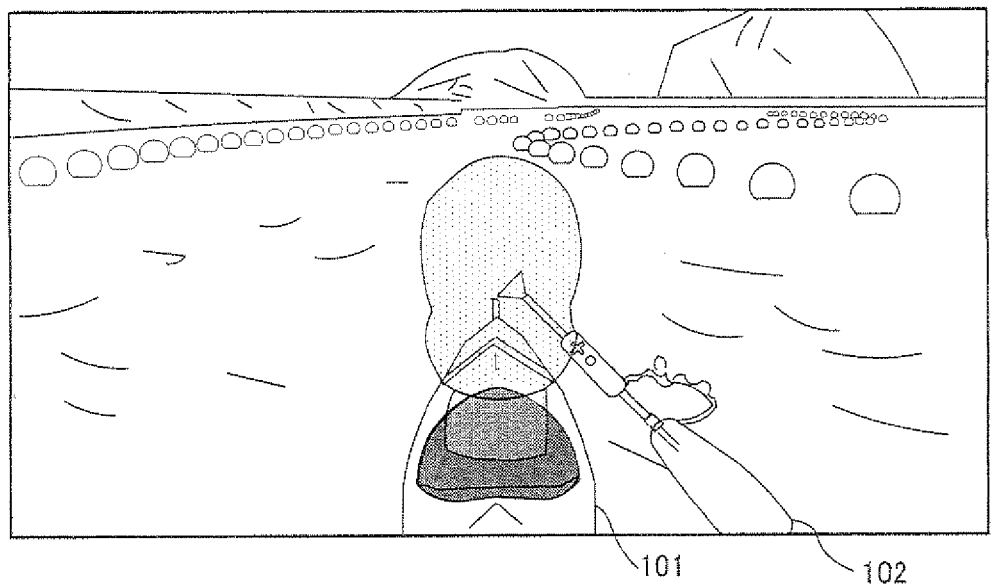
FIG. 19 shows an exemplary game screen assumed in this embodiment.

An operation method of this game will be described in more detail. In this game, the player holds the input device 8 as if the input device 8 was a paddle as described above. The player plays the game by performing an operation mimicking paddling (hereinafter, referred to simply as "paddling operation"). In this embodiment, the paddling operation is detected and reflected on the posture or motion of the paddle 102 in the virtual game space. FIG. 13 and FIG. 14 schematically show an example of the paddling operation performed by the player. As shown in FIG. 13, the player holds the input device 8 with his/her right hand such that the button surface of the input device 8 is directed toward the player. In FIG. 13, the player holds the input device 8 with only his/her right hand for the convenience of description, but the player may operate the input device 8 with both of his/her hands.

As shown in FIG. 14, the player holding the input device 8 as described above moves the input device 8 to a position behind him/her as if paddling through the water (FIG. 14(a) through FIG. (c)). Then, the player once moves the input device 8 upward as if pulling the paddle up from the water, and then moves the input device 8 forward (FIG. 14(d) through FIG. 14(f)). Basically, the player repeats such an operation to perform a paddling operation.

In this game, as shown in FIG. 15 through FIG. 19, the player may optionally switch the paddling position from right to left or vice versa in accordance with the progress of the game. In FIG. 15 through FIG. 19, the paddling position is switched from left to right. In this case, the player, who has been performing the paddling operation on the left side of his/her body, moves the input device 8 to the right side of his/her body (in the case where the player performs the operation with a single hand, the player switches the hand holding the input device 8 from left to right) and continues the paddling operation.

Figure 20:
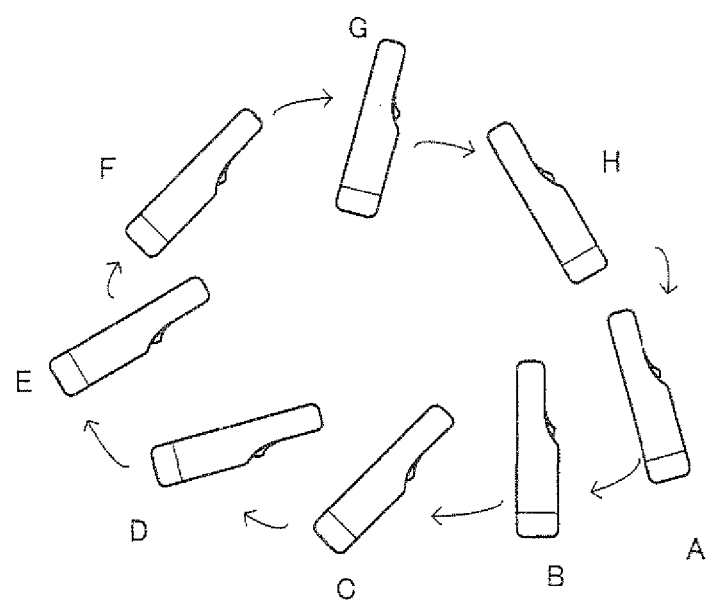
FIG. 20 shows a motion of an input device 8 in a paddling operation.
Figure 21:
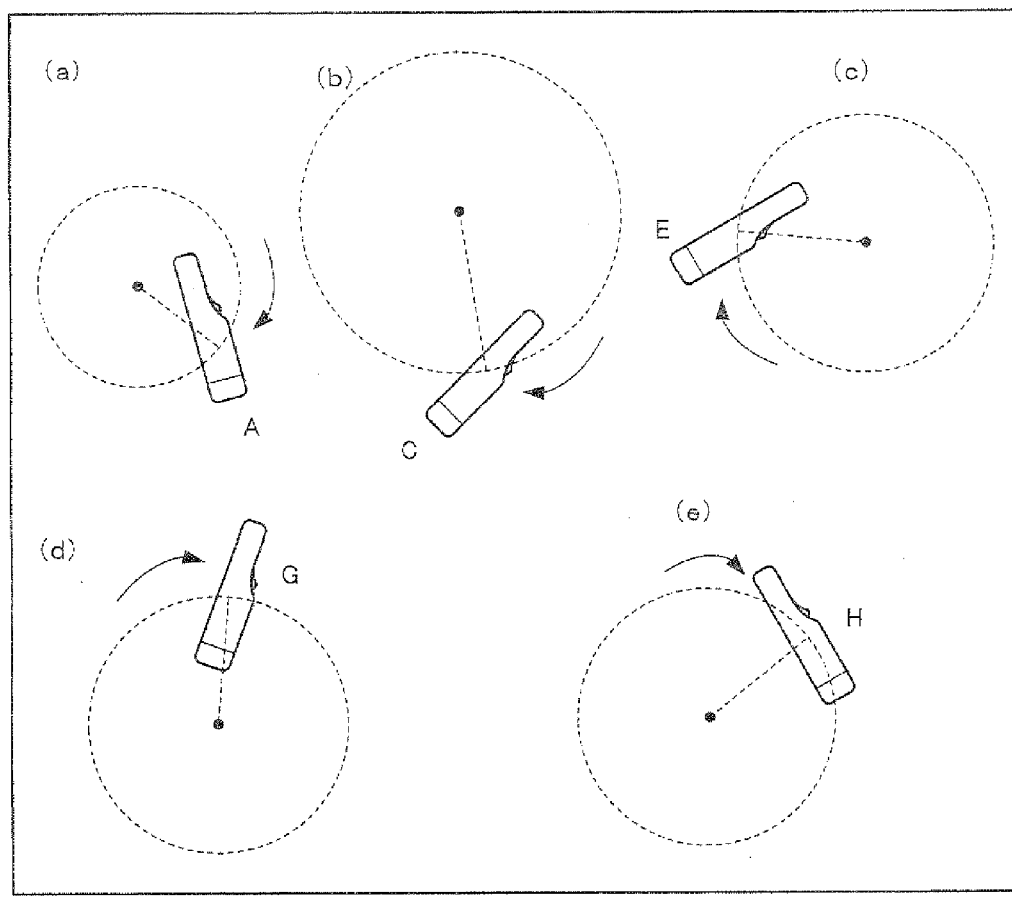
FIG. 21 shows a motion of the input device 8 in a paddling operation.

The motion of the input device 8 in the above-described paddling operation draws a locus as shown in FIG. 20. A motion made by a human being is considered to be formed of a combination of rotations around joints. Considering this series of motions by a predetermined unit time (represented with letters A through G in FIG. 20), the motion of the input device 8 of each unit time can be regarded as a part of a rotation motion made around a certain position as the center. FIG. 21 shows the states of the input device 8 at the unit times A, C, E, G and H in FIG. 20. As shown in FIG. 21, the motion of each unit time is a part of a rotation motion made around a certain position as the center. For example, in the case where a motion is made only by a rotation of the elbow, the center is the position of the elbow. In the case where a motion is made by a rotation of both of the elbow and the shoulder, a motion provided by the influence of the rotations of the elbow and the shoulder can be regarded as a rotation motion made around a certain position other than the elbow or the shoulder as the center. In other words, the velocity generated in the input device 8 is provided by a rotation motion made around a certain position as the center. Since it is difficult for a human being to make a perfectly circular motion, the center position or radius of the circular motion is slightly changed timing by timing.

In this embodiment, the following processing is executed. The posture of the input device 8 is estimated based on the acceleration and the angular velocity obtained from the acceleration sensor 37 and the gyrosensor unit 7, and the center position of the rotation motion and the moving velocity of the input device 8 are also estimated. Then, these estimated elements are reflected on the posture and motion of the paddle 102.

Figure 22:
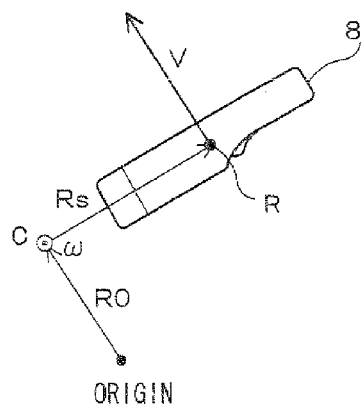
FIG. 22 illustrates the principle for estimating the moving velocity.

Now, the principle for estimating the center of the rotation motion or the moving velocity in this embodiment will be described. Here, a state shown in FIG. 22 will be used as an example. FIG. 22 shows the relationship between the input device 8 and the rotation motion in a certain unit time. It is assumed that the input device 8 rotates around the X axis in the controller coordinate system (local coordinate system) of the input device 8. Hereinafter, the vector of this rotational axis direction (the X-axis direction in this case) will be represented with ω (hereinafter, this vector will occasionally be referred to as "rotation axis vector ω"). The rotation velocity is represented with the magnitude of vector ω. In FIG. 22, the position of the input device 8 (in this embodiment, the position of the center part of the input device 8) is represented with R, the center of the rotation motion is represented with C, and the vector from C to R regarding the rotation motion is represented as vector Rs (hereinafter, this vector will occasionally be referred to as "radial vector Rs"). Vector Rs indicates the relative positional relationship between the rotation center C and the input device 8, and also indicates the radius of the rotation motion. The vector indicating the moving velocity of the input device 8 in the rotation motion is represented with V (hereinafter, this vector will occasionally be referred to as "velocity vector V"). A predetermined position in the controller coordinate system of the input device 8 is set as the origin. The vector from the origin to the rotation center is represented as vector R0.

In the exemplary state shown in FIG. 22, velocity vector V can be found by the outer product of vector ω and vector Rs as represented by the following expression.

$$V = \omega \times Rs \qquad \text{expression 1}$$

In expression 1, "×" represents the outer product (this is also applied to the following expressions).

Vector ω can be calculated based on the output from the gyrosensor unit 7. Specifically, a vector having, as x, y and z components, angular velocities around the three axes of the X, Y and Z axes output from the gyrosensor unit 7 is rotation axis vector ω. Vector Rs can be calculated as follows.

Regarding the series of motions performed on the input device 8 as shown in FIG. 14, the center position of the rotation motion may be slightly changed (varying amount R0 in FIG. 22 may be slightly changed) occasionally. Nonetheless, in the case of the paddling operation as shown in FIG. 14, such a center position is considered to change relatively very slowly as compared with the rotation motion itself. Accordingly, in this embodiment, the influence of the change of the center position of the paddling operation is considered to be negligible with respect to the rotation motion itself. Namely, regarding the series of motions in the paddling operation as shown in FIG. 14, the translational motion is ignored and only the rotation motion is considered to be performed. For this reason, the right term of expression 1 is provided by an approximation made to exclude a component by the movement of the center position, i.e., by a change of R0. The following expression is derived by differentiating expression 1.

$$A = \dot{V} = \dot{\omega} \times Rs - \omega^2 Rs \qquad \text{expression 2}$$

$$= \{[\dot{\omega}x] - \omega^2[I]\}Rs$$

$$[\dot{\omega}x] = \begin{pmatrix} 0 & -\dot{\omega}z & \dot{\omega}y \\ \dot{\omega}z & 0 & -\dot{\omega}x \\ -\dot{\omega}y & \dot{\omega}x & 0 \end{pmatrix}$$

In expression 2, "A" is a differential of V and indicates an acceleration. "A" can be specified by an acceleration component (hereinafter, referred to as the "motion component") obtained by removing a gravity component from the acceleration obtained from the acceleration sensor. The elements represented by letters having a dot thereabove each represent a differential. "[I]" represents a unit matrix.

The following expression is derived by transforming expression 2.

$$A = \dot{V} = \dot{\omega} \times Rs + \omega \times \dot{Rs} \qquad \text{expression 3}$$

$$= \dot{\omega} \times Rs + \omega \times (\omega \times Rs)$$

The following expression is derived by transforming expression 3.

$$A = \dot{\omega} \times Rs + (\omega \cdot Rs)\omega - (\omega \cdot \omega)Rs \qquad \text{expression 4}$$

Vector ω is a rotation axis and vector Rs is a radius of rotation. Therefore, defining vector Rs as having the shortest possible length (i.e., the rotation center and the input device 8 has the same depth in FIG. 22), vector ω and vector Rs always cross each other perpendicularly. These vectors crossing each other perpendicularly means that the inner product is 0. Accordingly, in expression 4 above, the element of "(ω·Rs)ω" is "0". As a result, the following expression is obtained by transforming expression 4.

$$A = \dot{\omega}Rs - \omega^2 Rs \qquad \text{expression 5}$$

As shown in expression 5, vector Rs can be calculated once motion component A and vector ω are found. Motion component A is found by removing the gravity component from the acceleration component. In order to remove the gravity component, the direction of gravity needs to be found. In this embodiment, the posture of the input device 8 is estimated based on the angular velocity and the acceleration, and the direction of gravity is estimated based on the estimated posture.

In consideration of the above, expression 2 is transformed. As a result, the following expression is obtained.

$$Rs = \{[\dot{\omega}x] - \omega^2[I]\}^{-1}A \qquad \text{expression 6}$$

$$= \begin{pmatrix} -\omega^2 & -\dot{\omega}z & \dot{\omega}y \\ \dot{\omega}z & -\omega^2 & -\dot{\omega}x \\ -\dot{\omega}y & \dot{\omega}x & -\omega^2 \end{pmatrix}^{-1} A$$

As shown in expression 6, vector Rs can be calculated once motion component A, angular velocity ω and the angular acceleration are found. In this embodiment, the posture of the input device 8 is estimated based on the angular velocity and the acceleration, and motion component A is estimated based on the estimated posture. Once motion component A is calculated, vector Rs can be calculated as described above. Once vector Rs is calculated, the processing of calculating velocity V by obtaining the outer product of vector Rs and vector ω using expression 1 is executed.

Figure 23:
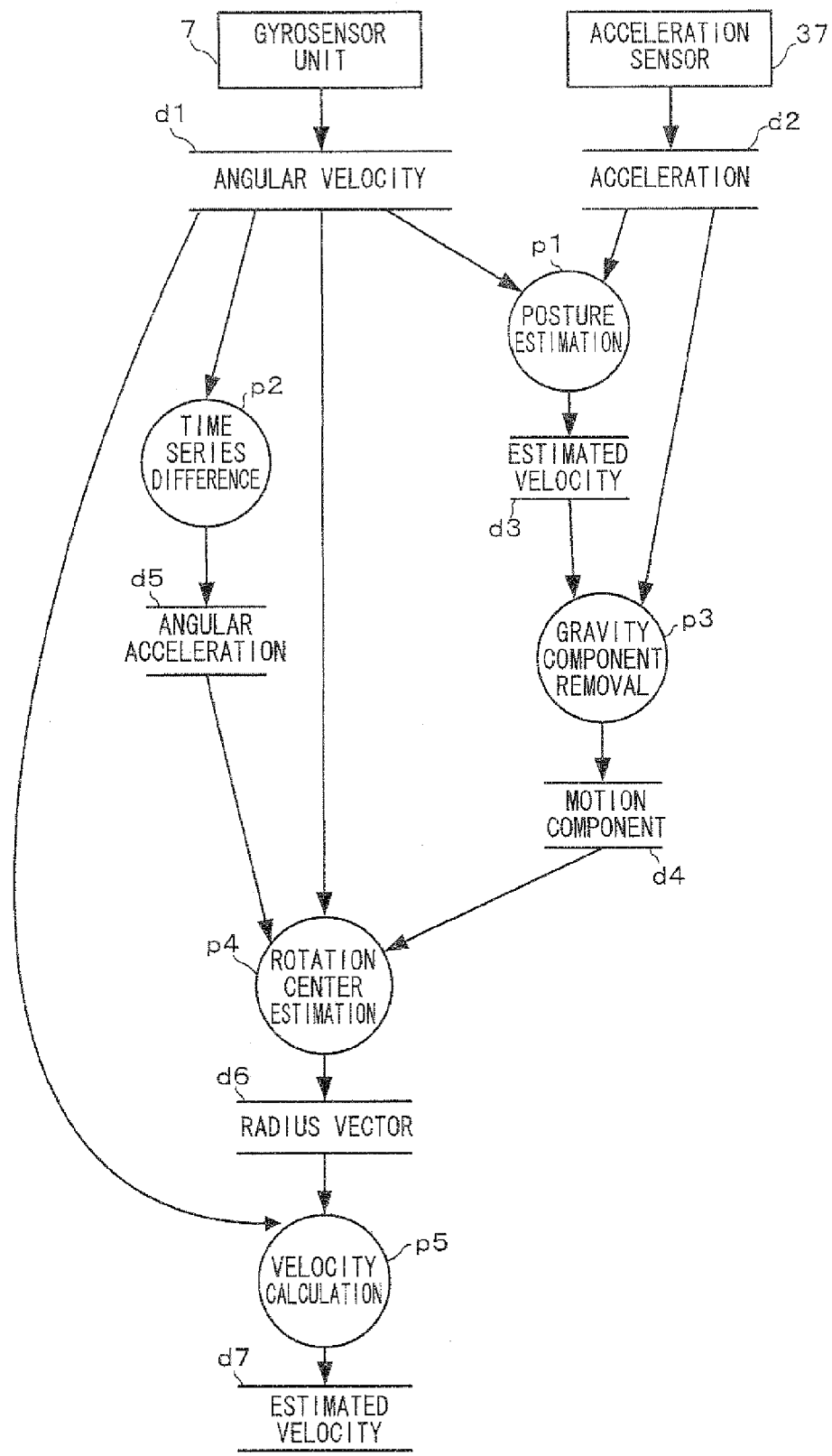
FIG. 23 shows an overview of processing executed according to this embodiment.

Now, an overview of the processing executed in this embodiment will be described. FIG. 23 shows an overview of the processing executed in this embodiment. In FIG. 23, the elements surrounded by square represent generating sources of data. The elements surrounded by circle represent processes and are provided with reference numerals in the "pn" form (n is an integer). The elements sandwiched by upper and lower lines represent data (and the areas in which the data is stored; corresponding to the memory map of FIG. 24), and are provided with reference numerals in the "dn" form (n is an integer).

With reference to FIG. 23, angular velocity d1 is obtained from the gyrosensor unit 7. Acceleration d2 is obtained from the acceleration sensor 37. Angular velocity d1 and acceleration d2 are input to the process of posture estimation p1. In posture estimation p1, the processing of estimating the posture of the input device 8 based on angular velocity d1 and acceleration d2 and outputting the estimated posture of the input device 8 as estimated posture d3 is executed. For calculating the estimated posture based on the acceleration and the angular velocity, any method is usable. In this embodiment, a posture vector represented by the angular velocity is corrected by a vector represented by the acceleration to calculate the posture of the input device 8. Ideally, by updating the posture based on the angular velocity at every unit time, the posture of the input device 8 can be calculated only based on the angular velocity, and the downward direction in an actual space viewed from the input device 8 (i.e., the direction of gravity) is estimated from the relationship between the space and the posture. However, there is a possibility that the output from the gyrosensor unit 7 includes an error. In the case where an error is included, the posture calculated as described above has errors accumulated therein as time passes. By contrast, the output from the acceleration sensor is an acceleration applied on the input device 8. Such an output includes only a gravity component when the input device 8 is static, but includes accelerations other than the gravity component when the input device 8 is moving. For this reason, it is difficult to estimate the direction of gravity only based on the acceleration. Therefore, the estimated posture is updated based on the angular velocity, and further the posture is corrected such that the direction of gravity estimated based on the posture becomes closer to the direction represented by the acceleration. At this time, as the magnitude of the acceleration is closer to the magnitude of the gravitational acceleration, the degree of correction is made larger. By performing such a correction, the posture is calculated more accurately based on the acceleration when there is little motion of the input device 8, and the posture can be always estimated with a certain degree of appropriateness even when the input device 8 is moving.

Estimated posture d3 calculated in posture estimation p1 is input to the process of gravity component removal p3. In gravity component removal p3, the processing of calculating a gravity component based on estimated posture d3 is executed. The direction of gravity is estimated in correspondence with the posture, and the magnitude of gravity is 1 G as already known. In gravity component removal p3, acceleration d2 is further obtained and a gravity component is removed from acceleration d2. Thus, a motion component d4 deprived of the influence of the gravity is calculated. Motion component d4 is input to the process of rotation center estimation p4 described later.

Angular velocity d1 is also input to each of the processes of time series difference p2, rotation center estimation p4 and velocity calculation p5. In time series difference p2, the processing of calculating angular acceleration d5 based on angular velocity d1 is executed. Angular acceleration d5 calculated is input to rotation center estimation p4.

In rotation center estimation p4, the processing of estimating center C of the above-described rotation motion based on angular velocity d1, motion component d4 and angular acceleration d5 by applying the above-described expressions is executed. More specifically, the processing of calculating vector Rs described above is executed. Data representing vector Rs calculated is output as radius vector d6.

Radius vector d6 is input to the process of velocity calculation p5. In velocity calculation p5, the processing of estimating moving velocity V of the input device 8 based on angular velocity d1 and radius vector d6 by the above-described expression is executed. As a result, estimated velocity d7 is output.

As described above, in this embodiment, the processing is executed of outputting the moving velocity of the input device 8 in the rotation motion using, as inputs, the angular velocity and the acceleration which are output from the gyrosensor unit 7 and the acceleration sensor 37. In the game processing in this embodiment, varies data including the moving velocity described above is used for controlling the posture of the paddle 102.

Figure 24:
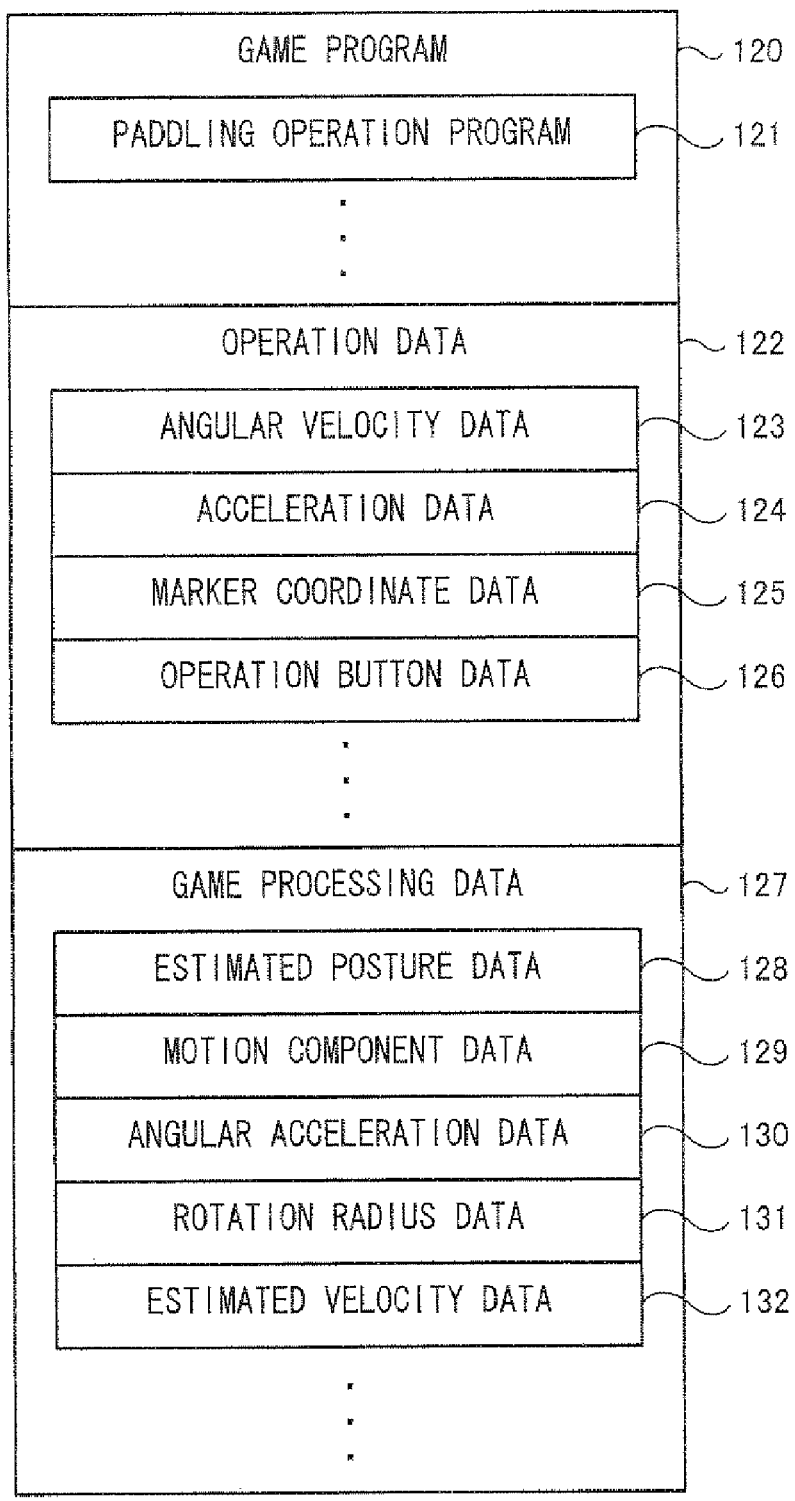
FIG. 24 shows main data stored in a main memory (an external main memory 12 or an internal main memory 11e) of the game apparatus 3.

Now, the processing executed by the game apparatus 3 will be described in more detail. First, with reference to FIG. 24, main data used in the processing executed by the game apparatus 3 will be described. FIG. 24 shows main data stored in the main memory of the game apparatus (the external main memory 12 or the internal main memory 11e). As shown in FIG. 24, the main memory of the game apparatus 3 has stored therein a game program 120, operation data 122 and game processing data 127. In addition to the data shown in FIG. 24, the main memory also has stored therein image data on various objects appearing in the game, data representing various parameters of the objects, and other data necessary for the game.

The game program 120 is partially or entirely read from the optical disc 4 and stored in the main memory at an appropriate timing after the power of the game apparatus 3 is turned on. The game program 120 includes a paddling operation program 121. The paddling operation program 121 is a program for executing the processing of calculating the posture of the input device 8 and controlling the posture of the paddle 102 based on the posture of the input device 8.

The operation data 122 is transmitted from the controller 5 (input device 8) to the game apparatus 3. As described above, the operation data is transmitted from the controller 5 to the game apparatus 3 at a rate of once in 1/200 seconds. Therefore, the operation data 122 stored in the external main memory 12 is updated at this rate.

The operation data 122 includes angular velocity data 123, acceleration data 124, marker coordinate data 125 and operation button data 126. The angular velocity data 123 represents the angular velocity detected by the gyrosensors 55 and 56 of the gyrosensor unit 7 (corresponding to angular velocity d1 in FIG. 23). In this embodiment, the angular velocity data 123 represents an angular velocity around each of the X, Y and Z axes shown in FIG. 3. The acceleration data 124 represents the acceleration detected by the acceleration sensor 37 (corresponding to acceleration d2 in FIG. 23). In this embodiment, the acceleration data 124 represents a three-dimensional acceleration vector having accelerations in the three axial directions of X, Y and Z as components. In this embodiment, the magnitude of the acceleration vector detected by the acceleration sensor 37 in the state where the controller 5 is static is set to "1". Namely, the magnitude of the gravitational acceleration detected by the acceleration sensor 37 is "1".

The marker coordinate data 125 represents a coordinate calculated by the image processing circuit 41 of the imaging information calculation section 35, i.e., the above-mentioned marker coordinate. The marker coordinate is represented in a two-dimensional coordinate system for indicating a position on a plane corresponding to the taken image. In the case where two markers 6R and 6L are imaged by the imaging element 40, two marker coordinates are calculated. By contrast, in the case where only one of the markers 6R and 6L is present in the range which can be imaged by the imaging element 40, only one marker is imaged by the imaging element 40 and only one marker coordinate is calculated. In the case where neither markers 6R nor 6L is present in the range which can be imaged by the imaging element 40, no marker is imaged by the imaging element 40 and no marker coordinate is calculated. Accordingly, the marker coordinate data 125 may represent two marker coordinates or one marker coordinate, or may indicate that there is no marker coordinate.

The operation button data 126 represents an input state of each of the operation buttons 32a through 32i.

The game processing data 127 is used in the game processing described later (shown in the flowcharts of FIG. 25 and FIG. 26). The game processing data 127 includes estimated posture data 128, motion component data 129, angular acceleration data 130, rotation radius data 131, and estimated velocity data 132. In addition to the data shown in FIG. 24, the game processing data 127 also includes various other data used in the game processing (for example, data representing game parameters).

The estimated posture data 128 represents the posture of the input device 8 calculated based on the angular velocity data 123 and the acceleration data 124 (corresponding to estimated posture d3 in FIG. 23).

The motion component data 129 represents the motion component obtained by removing the component of the direction of gravity from the acceleration represented by the acceleration data 124 (corresponding to motion component d4 in FIG. 23).

The angular acceleration data 130 represents a change of the angular velocity per unit time, i.e., the angular acceleration (corresponding to angular acceleration d5 in FIG. 23).

The rotation radius data 131 represents vector Rs mentioned above and also represents the center position of the rotation motion of the input device 8 (corresponding to radius vector d6 in FIG. 23).

The estimated velocity data 132 represents the moving velocity of the input device 8 of the above-described rotation motion thereof (corresponding to estimated velocity d7 in FIG. 23).

The estimated posture data 128 is a rotation matrix or the like representing the input device 8 in a space. The motion component data 129, the angular acceleration data 130, the rotation radius data 131, and the estimated velocity data 132 are each represented as a three-dimensional vector in the XYZ coordinate system (controller coordinate system) which is set based on the input device 8 (controller 5).

Figure 12:
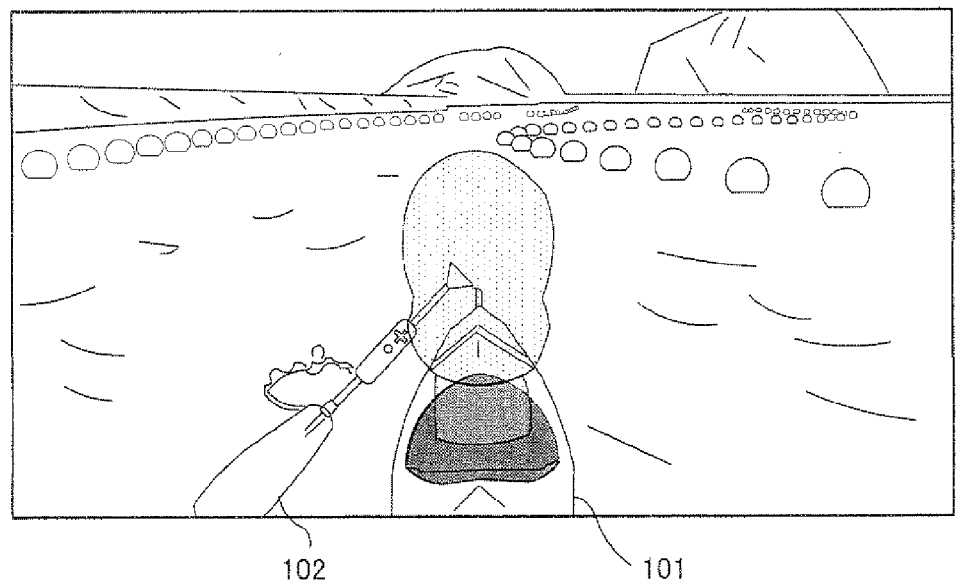
FIG. 12 shows an exemplary game screen assumed in this embodiment.

Now, with reference to FIG. 25 and FIG. 26, the game processing executed by the game apparatus 3 will be described. When the power of the game apparatus 3 is turned on, the CPU 10 of the game apparatus 3 executes a starting program stored on the ROM/RTC 13 to initialize various units including the external main memory 12. The game program stored on the optical disc 4 is read onto the external main memory 12, and the CPU 10 starts the execution of the game program. The flowchart in FIG. 12 shows the game processing executed after the above-described processing is completed. The processing loop of steps S1 through S10 shown in FIG. 12 is performed repeatedly for each frame.

Figure 25:
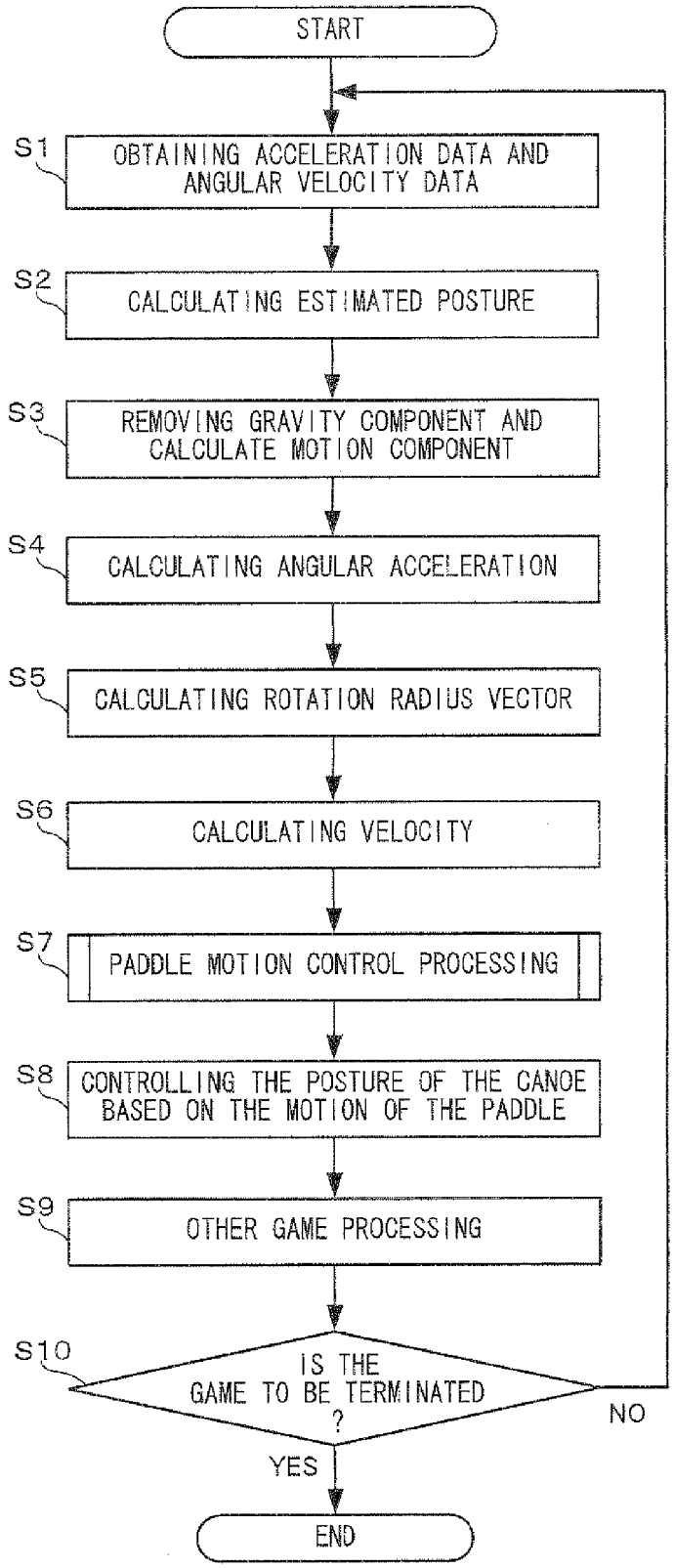
FIG. 25 is a flowchart showing game processing according to this embodiment of the present invention.

With reference to FIG. 25, the CPU 10 first obtains the acceleration data 124 and the angular velocity data 123 from the input device 8 (step S1).

Next, the CPU 10 executes the processing of estimating the posture of the input device 8 based on the acceleration data 124 and the angular velocity data 123 (step S2). This processing may be executed in any method. In this embodiment, as described above, the posture of the input device 8 is first calculated based on the angular velocity detected by the gyrosensor unit 7. The posture is calculated based on the angular velocity by, for example, successively adding the angular velocity (per unit time) to the initial posture. Namely, the current posture can be calculated by integrating the angular velocity which is output successively from the gyrosensor unit 7 and calculating the change amount of the posture from the initial state based on the integration result. Next, based on the acceleration data detected by the acceleration sensor 37, the posture calculated based on the angular velocity is corrected. In this embodiment, the correction is performed so as to make the posture calculated based on the angular velocity closer to the posture determined based on the acceleration data. The "posture determined based on the acceleration data" is specifically a posture of the input device 8 in the case where the direction of acceleration represented by the acceleration data is assumed to be downward, namely, a posture calculated with a hypothesis that the acceleration represented by the acceleration data is a gravitational acceleration. The posture corrected in this manner is stored as the estimated posture data 128 in the external main memory 12.

Next, the CPU 10 executes the processing of calculating the motion component (step S3). First, the CPU 10 calculates the direction of gravity based on the estimated posture. Then, based on the calculated direction of gravity, the CPU 10 removes the gravity component (for example, the vector representing the direction of gravity (0, −1, 0)) from the acceleration data 124 to calculate the motion component deprived of the influence of the gravity. The CPU 10 stores the calculated motion component as the motion component data 129 in the external main memory 12.

Next, the CPU 10 executes the processing of calculating the angular acceleration (step S4). Specifically, the CPU 10 calculates a change amount of the angular velocity in a predetermined time period. For example, the CPU 10 calculates a difference between the angular velocity obtained by the processing in the current frame and the angular velocity obtained by the processing in the immediately previous frame, and stores the difference as the angular acceleration data 130 in the external main memory 12.

Next, the CPU 10 executes the processing of calculating vector Rs of the rotation motion (step S5). Specifically, the CPU 10 calculates vector Rs based on the angular velocity data 123, the angular acceleration data 130 and the motion component data 129 by applying expression 6. The CPU 10 stores the calculated vector Rs as the rotation radius data 131 in the external main memory 12.

Next, the CPU 10 calculates moving velocity V of the input device 8 (step S6). As shown in expression 1 above, once vector Rs is found, moving velocity V can be calculated by finding the outer product of vector Rs and rotation axis vector ω (angular velocity data 123). The CPU 10 stores the calculated moving velocity V as the estimated velocity data 132 in the external main memory 12.

Next, the CPU 10 executes paddle motion control processing of controlling the motion of the paddle 102 (step S7). In this processing, the CPU 10 controls the paddle 102 based on the estimated posture data 128 and the estimated velocity data 132.

Figure 26:
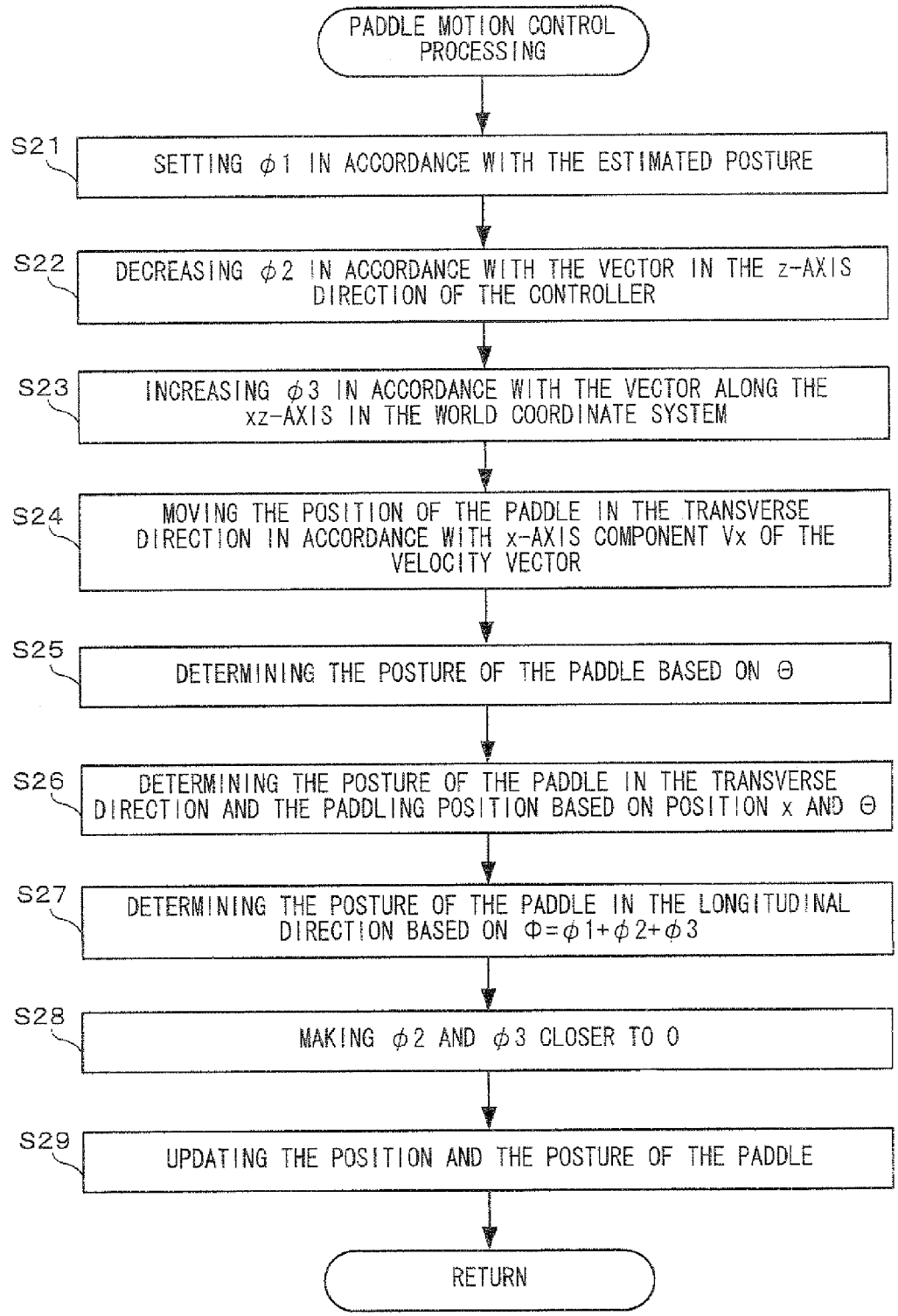
FIG. 26 is a flowchart showing paddle motion control processing in step S7 of FIG. 25 in detail.
Figure 27:
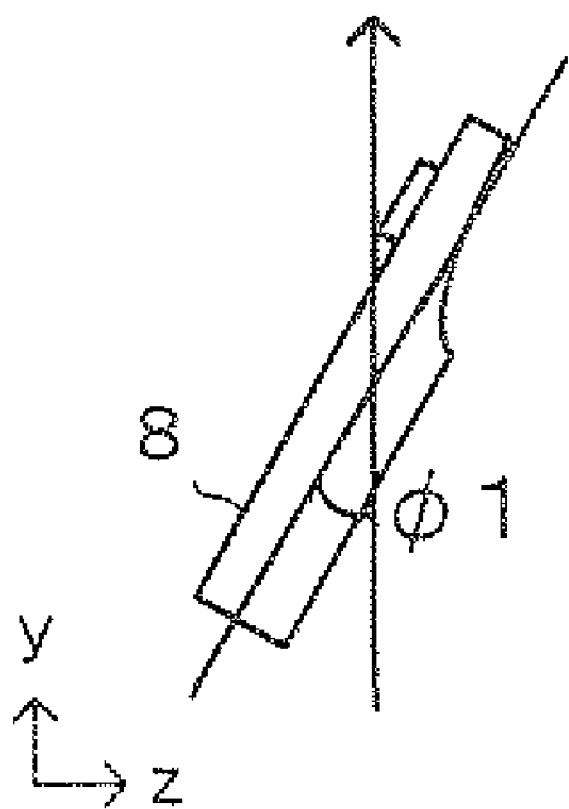
FIG. 27 illustrates variable φ1.

FIG. 26 is a flowchart showing the paddle motion control processing shown in step S7 in detail. In the processing of FIG. 26, the processing of setting variables $\phi 1$, $\phi 2$ and $\phi 3$ is first executed. Now, the variables will be described. As shown in FIG. 27, variable $\phi 1$ is for indicating an inclining angle of the input device 8 from the axis of direction of gravity along the y-z plane (controller coordinate system). Namely, variables $\phi 1$ increases when paddling is performed and decreases when the paddle is returned to the original position thereof.

Figure 28:
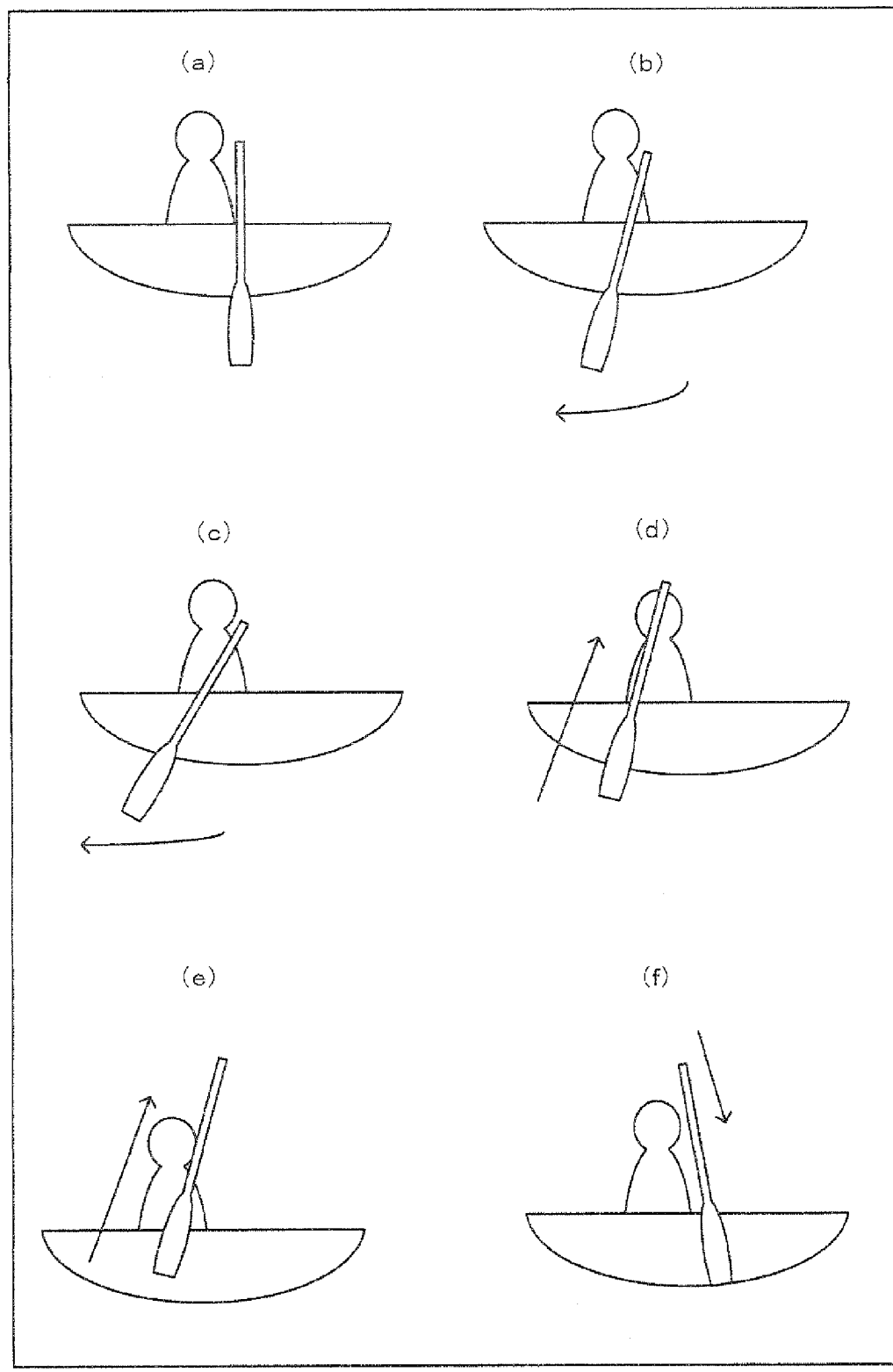
FIG. 28 illustrates "pulling"

Variable φ2 is used for taking "pulling" into consideration in the paddling operation. Herein, referring to FIG. 28, "pulling" means a stroke of moving the paddle so as to be pushed upward (pulled) after paddling through the water. Since there are individual differences in the manner of paddling operation among players, some players may perform such a pulling operation. In this case, as compared with the motion of the input device 8 shown in FIG. 20, a larger motion is generated in the Z-axis direction in the controller coordinate system when the paddle is pulled. When such a motion is performed, the player thinks that he/she has performed an operation of pulling the paddle back, but the decrease in the angle is small. Accordingly, variable φ2 is set such that the length of the vector is reflected on the inclining angle of the paddle 102 (such that the angle is increased or decreased in accordance with the length of the vector). As an initial value of variable φ2, "0" is set.

Figure 29:
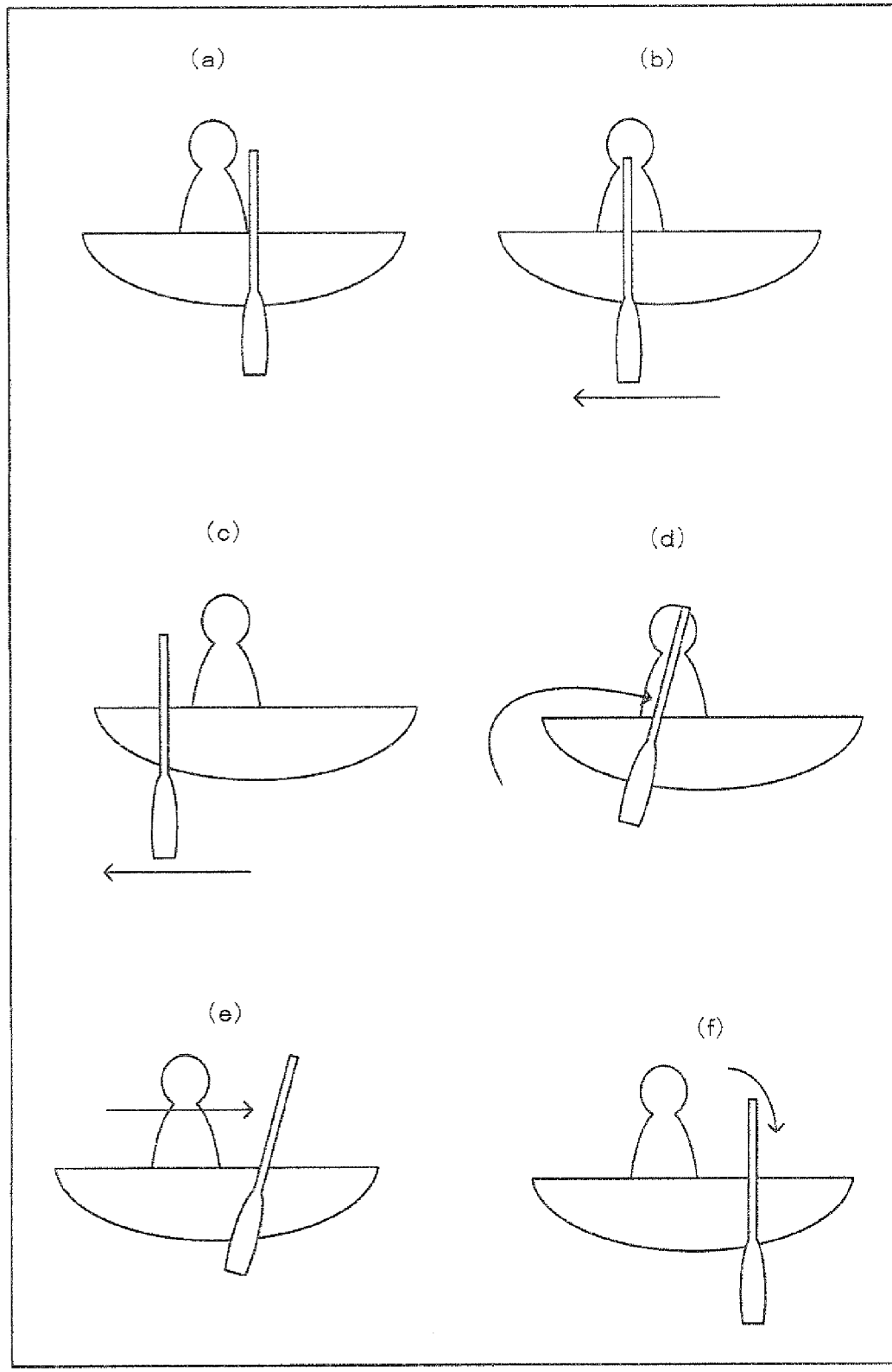
FIG. 29 illustrates "translation paddling"

Variable φ3 is used for taking "translation paddling" into consideration in the paddling operation. Herein, referring to FIG. 29, the "translation paddling" means a stroke of paddling through the water while moving the paddle backward without changing the posture of the paddle largely. As compared with the motion shown in FIG. 20, the angle is not much changed. Variable φ3 is also used to increase or decrease the angle in accordance with the length of the vector of the translation. As an initial value of variable φ3, "0" is set.

Returning to FIG. 26, the paddle motion control processing will be described in detail. As shown in FIG. 26, the CPU 10 first sets variable φ1 (step S21). Variable φ1 can be calculated as an angle between the estimated posture data 128 and the direction of gravity derived from the estimated posture.

Figure 30:
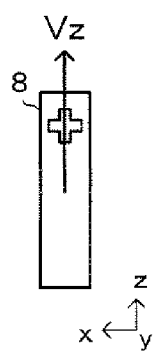
FIG. 30 illustrates Z-axis component Vz of velocity vector V.

Next, based on the estimated velocity data 132, the CPU 10 sets variable φ2 (step S22). More specifically, the CPU 10 decreases variable φ2 in accordance with Z-axis component Vz (see FIG. 30) of velocity vector V represented by the estimated velocity data 132 (as a result, variable φ2 has a negative value).

Figure 31:
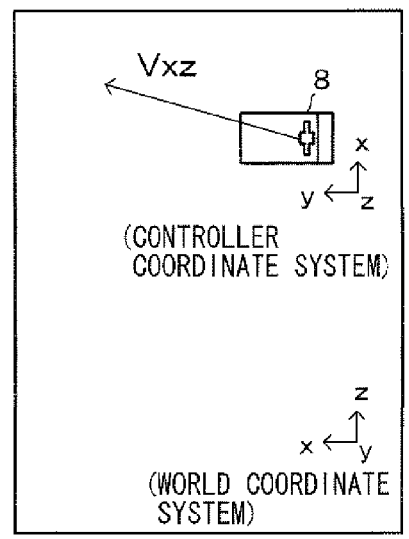
FIG. 31 illustrates variable φ3.

Next, based on the estimated velocity data 132, the CPU 10 sets variable φ3 (step S23). More specifically, the CPU 10 calculates a component in an x-z plane in the world coordinate system, namely, component Vxz other than a y-axis component of a vector in the world coordinate system converted from velocity vector V in the controller coordinate system (the vector represented by the estimated velocity data 132) (see FIG. 31 which shows an image of the world coordinate system seen from above). Then, the CPU 10 increases variable φ3 in accordance with the length of component Vxz.

Figure 32:
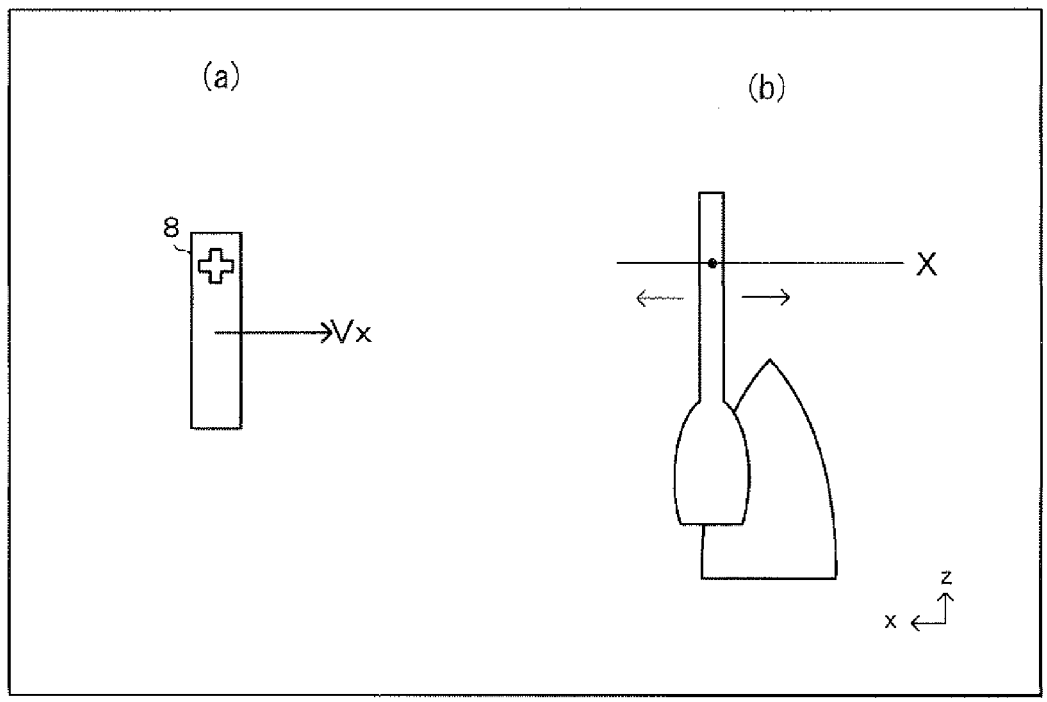
FIG. 32 illustrates an overview of processing in step S24 of FIG. 26.

Next, the CPU 10 determines the position of the paddle 102 on an x axis in the world coordinate system (such a position is a predetermined reference point on the paddle 102; corresponding to a part of the grasp of the paddle which is held by the player) in accordance with X-axis component Vx of velocity vector V (step S24). FIG. 32 shows a concept of this processing. In the processing of this step, as shown in FIG. 32(b), a predetermined point on the paddle 102 in the virtual game space is moved along the x-axis direction in accordance with X-axis component Vx of velocity vector V (shown in FIG. 32(a)) of the input device 8. Thus, the position of the paddle 102 in the left-right direction is determined.

Figure 33:
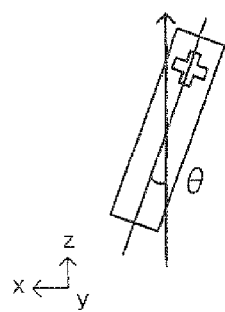
FIG. 33 illustrates processing in step S25 of FIG. 26.
Figure 34:
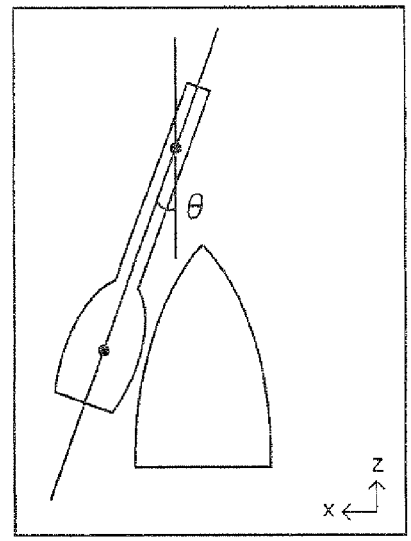
FIG. 34 illustrates the processing in step S25 of FIG. 26.

Next, as shown in FIG. 33 and FIG. 34, the CPU 10 calculates angle θ for determining an inclining degree of the paddle 102 on the x-z plane of the world coordinate system. Angle θ is calculated based on the estimated posture (FIG. 33). Based on angle θ, the posture of the paddle 102 on the x-z plane (FIG. 34) is determined (step S25).

Figure 35:
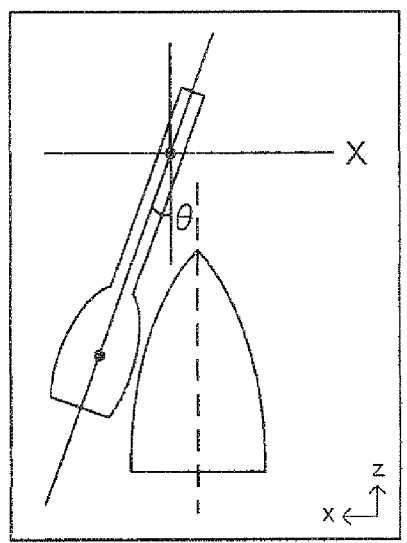
FIG. 35 illustrates processing in step S26 of FIG. 26.

Next, based on the position of the paddle 102 on the x axis determined in step S24 and the inclining degree of the paddle 102 determined in step S25, the CPU 10 determines the final posture of the paddle 102 on the x-z plane in the world coordinate system as shown in FIG. 35 (step S26). The CPU 10 also determines the position of paddling (whether the stroke is made on the right side or the left side of the canoe).

Figure 36:
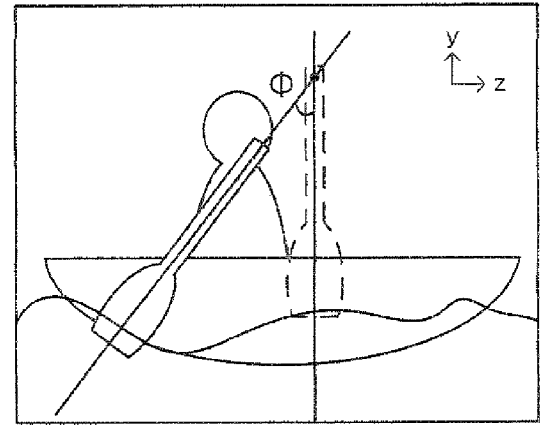
FIG. 36 illustrates processing in step S27 of FIG. 26.

Next, the CPU 10 calculates variable Φ representing the paddling degree of the paddle 102 on a y-z plane of the world coordinate system as shown in FIG. 36, using the following expression.

$$\Phi = \phi_1 + \phi_2 + \phi_3$$

The CPU 10 determines the final posture of the paddle 102 in accordance with variable Φ (step S27). The paddle may be determined to be inclined by Φ, but the present invention is not limited to this. The position and the posture may be set in accordance with the transition of the magnitude of Φ.

Next, the CPU 10 executes the processing of making variables φ2 and φ3 closer to 0 at a predetermined ratio (step S28). Namely, since variables φ2 and φ3 are not variables by the posture itself, φ2 and φ3 are made closer to 0 gradually in order to calculate variable Φ corresponding to the actual posture when the paddle 102 is static.

Next, the CPU 10 applies the posture of the paddle 102 determined by the above-described processing to the virtual game space and thus updates the position and the posture of the paddle 102 (step S29). Thus, the paddle motion control processing is completed.

Returning to FIG. 25, the CPU 10 executes posture and motion controls on the player object 101 based on the post-update posture of the paddle 102 (step S8).

Next, the CPU 10 executes other game processing (for example, making a determination on collision against an obstruction, and the like), and executes display processing (step S9). Specifically, the CPU 10 executes the processing of displaying an image of the virtual space taken by a virtual camera on the TV 2 as a game image. In step S10 after step S9, the CPU 10 determines whether or not the game is to be terminated. When it is determined as YES, the CPU 10 terminates the game processing. When it is determined as NO, CPU 10 returns to step S1 to repeat the game processing. Thus, the game processing in this embodiment is completed. The processing in step S8 or S9 may be executed at a cycle of 1/60 seconds, which is a game processing time unit. The processing before step S8 may be repeated at a cycle of 1/60 seconds, or at a cycle of 1/200 seconds at which data is obtained from the input device 8. The precision of the processing is higher when the processing is repeated a cycle of 1/200 seconds.

As described above, in this embodiment, the rotation radius (rotation center) of the motion applied on the input device 8 itself and the moving velocity of the input device 8 are calculated based on the angular velocity obtained from the gyrosensors and the acceleration obtained from the acceleration sensor, and are used for the game processing. As a result, a game utilizing the moving velocity and the length of the radius of the rotation motion of the input device can be provided. Also, a game enjoyed with a novel operation can be provided. Regarding the processing of calculating the motion of the input device 8 or the like, there is an advantage that "velocity" used above is easier to be processed than "acceleration". In addition, since the moving velocity of the input device 8 is found, the "posture" of the input device 8 can be separately processed from the "motion (moving velocity)" of the input device 8, and thus a novel game can be provided. For example, in a game in which letters are written in space, a motion on the "sweeping" stroke of a letter can be more accurately detected and reflected on the game processing (for example, drawing of a letter on a screen based on the locus of a letter written, addition of points, etc.).

As described above, the center of the rotation motion can be estimated from the angular velocity and the acceleration. Therefore, for example, in a game of performing a rotation motion in which the center of the rotation motion is the shoulder of the player and the length of the arm of the player corresponds to vector Rs (i.e., an operation of throwing the arm around largely with the shoulder being the support), the difference in the length of the arm among the players can be reflected on the game processing. Or, whether the arm is thrown around with the shoulder as the center or with the elbow or wrist as the center can be reflected on the game.

In accordance with the content of the game to be executed, a predetermined correction may be made on vector Rs described above. For example, in the processing in step S5 described above with reference to FIG. 25 for removing noise, vector Rs calculated by the immediately previous processing may be made closer to vector Rs calculated by the current processing with a predetermined coefficient (for example, a value in the range of 0 to 1), and the resultant vector may be used as the latest vector Rs. In this processing, the coefficient may be varied in accordance with the magnitude of vector $\omega$. Thus, the operation made by the player can be reflected on the game more appropriately. Due to the nature of expression 6 for calculating vector Rs, the error is smaller when vector $\omega$ is larger than when vector $\omega$ is smaller. Accordingly, when vector $\omega$ is large, vector Rs is more reliable and therefore the coefficient is made larger. When vector $\omega$ is small, the coefficient is made smaller. In this manner, noise can be removed more precisely.

As other types of correction, in a certain type of game, vector Rs may be corrected with the length of the arm of the player or the manner of swinging the input device 8 of the player being assumed in advance. Specifically, when the magnitude of the calculated vector Rs is significantly different from the assumed length of the arm, a limit may be provided for the length of the arm to be calculated or the calculated length of the arm may be made closer to a specific magnitude. In this manner, an input appropriate to the purpose of the game is obtained.

In any type of correction, velocity vector V can be varied in accordance with a change of angular vector $\omega$ by correcting vector Vs instead of correcting velocity vector V. When velocity vector V is corrected, the responsiveness may be possibly reduced in a game executed based on the velocity. However, vector $\omega$ is always obtained at a certain degree of accuracy. Therefore, an input which is highly precise and highly responsive can be performed by the corrected vector Rs and vector $\omega$.

In the above embodiment, velocity vector V is utilized for the canoe game. As described above, velocity vector V is calculated from radius vector Rs. Therefore, this game is also regarded as utilizing radius vector Rs. In other embodiments, radius vector Rs itself may be reflected on the control of the game. For example, the radius of paddling in the game, i.e., the depth of paddling may be controlled in accordance with the length of radius vector Rs. In the above embodiment, the vectors are calculated for controlling the game. In the case where a value required for the control is a scalar value, the radius may be calculated with a scalar value.

In the above embodiment, a game using canoe as a material is described as an example. The present invention is also applicable to game processing using figure skating as a material. For example, it is conceived that a player holding the input device 8 makes a motion mimicking a spinning motion of figure skating, the center and radius of this rotation motion are calculated, and the posture and motion of the player character in the virtual game space are controlled.

The present invention is also applicable to game processing of a music game using drumming as a material. Specifically, a player treats the input device 8 as a drum stick and performs an operation as if beating a drum. Regarding such an operation of beating a drum, a motion per unit time can be considered to be a part of a rotation motion made around a certain position as the center. Therefore, it is conceived that the center is calculated, and the posture of the drum stick in the virtual game space is controlled.

The present invention is also applicable to game processing using dancing as a material. Specifically, a player holding the input device 8 moves his/her arm following the choreography of the character displayed on the screen. The posture or moving velocity of the input device 8 in such a motion of the arm may be calculated, and the motion of the arm or the like of the player character in the virtual game space may be controlled.

The present invention is also applicable to a baseball game or a golf game as follows, for example. Regarding an operation of swinging the input device 8 as if the input device 8 was a baseball bat or a golf club, the velocity of the swing is controlled based on the moving velocity of the input device 8, and the swinging manner of, for example, making a large swing or a small swing is controlled based on the length of the radius of the rotation motion.

While the invention has been described in detail, the foregoing description is in all aspects illustrative and not restrictive. It is understood that numerous other modifications and variations can be devised without departing from the scope of the invention.

What is claimed is:

1. A game apparatus, comprising:
    a processor; and
    a memory coupled to said processor, said memory storing instructions that, when executed by said processor, control said processor to:
    obtain operation data including at least acceleration data and angular velocity data from an input device including at least an acceleration sensor and a gyrosensor;
    estimate a center of a rotation motion applied on the input device and a radius of the rotation, based on the acceleration data and the angular velocity data;
    estimate moving velocity of the input device in the rotation motion, based on the radius of the rotation and angular velocity data; and
    execute game processing based on the estimated moving velocity and the radius of the rotation.

2. A game apparatus according to claim 1, wherein the moving velocity of the input device and the radius of the rotation are estimated by approximating the rotation motion, the approximation ignoring an influence of a change of the center of the rotation motion.

3. A game apparatus according to claim 1, wherein the processor is further controlled to calculate angular acceleration data based on a change of the angular velocity data in a predetermined time period; and
    calculate the radius of the rotation based on the acceleration data, the angular velocity data and the angular acceleration data, and wherein the moving velocity is estimated by calculating the moving velocity based on the radius of the rotation and the angular velocity data.

4. A game apparatus according to claim 1, wherein the processor is further controlled to calculate a posture of the input device based on the acceleration data and the angular velocity data.

5. A game apparatus according to claim 4, wherein:
the acceleration represented by the acceleration data includes a gravitational acceleration; and
the processor is further controlled to:
estimate the gravitational acceleration based on the calculated posture of the input device; and
calculate a motion component, which is an acceleration component other than a gravity component, by removing the gravitational acceleration from the acceleration represented by the acceleration data.

6. A game apparatus according to claim 4, wherein the game processing is executed based on the calculated posture of the input device and the calculated moving velocity.

7. A game apparatus according to claim 6, wherein the processor is further controlled to determine a posture, in a virtual game space, of an operation target object, which is a target of an operation made by a player, based on the posture of the input device, and determine a position of the operation target object based on the moving velocity.

8. A game apparatus according to claim 7, wherein game processing control is executed based on the posture of the input device, and based on the moving velocity, wherein an amount of control to be made is changed based on the posture of the input device.

9. A game apparatus according to claim 1, wherein the processor is controlled to execute a first control based on the moving velocity and execute a second control based on the radius of the rotation.

10. A game apparatus according to claim 1, wherein the radius of the rotation is estimated as a vector from the center of the rotation motion to a position of the input device.

11. A game apparatus according to claim 1, wherein the processor is further controlled to correct the radius of the rotation in accordance with a magnitude of the angular velocity represented by the angular velocity data.

12. A game apparatus according to claim 11, wherein a correction is performed such that as the angular velocity is larger, the degree of the angular velocity being reflected on the radius of the rotation is higher, whereas as the angular velocity is smaller, the degree of the angular velocity being reflected on the radius of the rotation is lower.

13. A game apparatus according to claim 5, wherein the radius of the rotation is calculated using the following expression:

$$Rs = \begin{pmatrix} -\omega^2 & -\dot{\omega}z & \dot{\omega}y \\ \dot{\omega}z & -\omega^2 & -\dot{\omega}x \\ -\dot{\omega}y & \dot{\omega}x & -\omega^2 \end{pmatrix}^{-1} A$$

where Rs is a value represented as the positional relationship, A is a value represented as the calculated motion component, and ω is a value of the angular velocity which is represented as the angular velocity data and is formed of three axis components of X, Y and Z axes perpendicularly crossing one another; and
$\dot{\omega}x$ is a differential value of an X-axis component of the angular velocity, $\dot{\omega}y$ is a differential value of a Y-axis component of the angular velocity, and $\dot{\omega}z$ is a differential value of a Z-axis component of the angular velocity.

14. A non-transitory computer readable storage medium having stored thereon a program to be executed by a computer of an imaging apparatus, the program causing the computer perform:
obtaining operation data including at least acceleration data and angular velocity data from an input device including at least an acceleration sensor and a gyrosensor;
estimating a center of a rotation motion applied on the input device and a radius of the rotation, based on the acceleration data and the angular velocity data;
estimating moving velocity of the input device in the rotation motion, based on the radius of the rotation and angular velocity data; and
executing processing based on the estimated moving velocity and the radius of the rotation.

15. A non-transitory computer readable storage medium having the program stored thereon according to claim 14, wherein the moving velocity of the input device and the radius of the rotation are estimated by performing an approximation on the rotation motion, the approximation ignoring an influence of a change of the center of the rotation motion.

16. A non-transitory computer readable storage medium having the program stored thereon according to claim 14, wherein:
angular acceleration data is calculated based on a change of the angular velocity data in a predetermined time period; and
the radius of the rotation is calculated based on the acceleration data, the angular velocity data and the angular acceleration data, and wherein the moving velocity is estimated by calculating the moving velocity based on the radius of rotation and the angular velocity data.

17. A non-transitory computer readable storage medium having the program stored thereon according to claim 14, wherein the program causes the computer to further perform calculating a posture of the input device based on the acceleration data and the angular velocity data.

18. A non-transitory computer readable storage medium having the program stored thereon according to claim 17, wherein:
the acceleration represented by the acceleration data includes a gravitational acceleration;
the gravitational acceleration is estimated based on the calculated posture of the input device; and
a motion component, which is an acceleration component other than a gravity component, is calculated by removing the gravitational acceleration from the acceleration represented by the acceleration data.

19. A non-transitory computer readable storage medium having the program stored thereon according to claim 17, wherein the processing is executed based on the calculated posture of the input device and the calculated moving velocity.

20. A non-transitory computer readable storage medium having the program stored thereon according to claim 19, wherein the processor is further configured to determine a posture, in a virtual game space, of an operation target object, which is a target of an operation made by a player, based on the posture of the input device, and determine a position of the operation target object based on the moving velocity.

21. A non-transitory computer readable storage medium having the program stored thereon according to claim 20, wherein the processor is further controlled to execute a control based on the posture of the input device, and based on the moving velocity, and further change an amount of control to be made based on the posture.

22. A non-transitory computer readable storage medium having the program stored thereon according to claim 14, wherein a first control is executed based on the moving velocity and a second control is executed based on the radius of rotation.

23. A non-transitory computer readable storage medium having the program stored thereon according to claim 14, wherein the radius of the rotation is estimated as a vector from the center of the rotation motion to a position of the input device.

24. A non-transitory computer readable storage medium having the program stored thereon according to claim 14, wherein the program causes the computer to further perform correcting the radius of the rotation in accordance with a magnitude of the angular velocity represented by the angular velocity data.

25. A non-transitory computer readable storage medium having the program stored thereon according to claim 24, wherein a correction is performed such that as the angular velocity is larger, the degree of the angular velocity being reflected on the radius of the rotation is higher, whereas as the angular velocity is smaller, the degree of the angular velocity being reflected on the radius of the rotation is lower.

26. A non-transitory computer readable storage medium having the program stored thereon according to claim 18, wherein the radius of rotation is calculated using the following expression:

$$Rs = \begin{pmatrix} -\omega^2 & -\dot{\omega}z & \dot{\omega}y \\ \dot{\omega}z & -\omega^2 & -\dot{\omega}x \\ -\dot{\omega}y & \dot{\omega}x & -\omega^2 \end{pmatrix}^{-1} A$$

where Rs means a value represented as the positional relationship, A means a value represented as the motion component calculated by the motion component calculation means, and ω means a value of the angular velocity which is represented as the angular velocity data and is formed of three axis components of X, Y and Z axes perpendicularly crossing one another; and $\dot{\omega}x$ means a differential value of an X-axis component of the angular velocity, $\dot{\omega}y$ means a differential value of a Y-axis component of the angular velocity, and $\dot{\omega}z$ means a differential value of a Z-axis component of the angular velocity.

27. A method of operating a processor, comprising:
obtaining acceleration data and angular velocity data from an input device, the input device including an acceleration sensor and a gyrosensor;
estimating a center of a rotation motion applied to the input device and a radius of the rotation, based on the acceleration data and the angular velocity data;
estimating moving velocity of the input device in the rotation motion, based on the radius of the rotation and angular velocity data; and
controlling the processor to perform an operation based on the estimated moving velocity and the radius of the rotation.

28. The method of claim 27, wherein the moving velocity of the input device and the radius of the rotation are estimated by approximating the rotation motion, the approximation ignoring an influence of a change of the center of the rotation motion.

29. The method of claim 27, wherein the processor is controlled to calculate angular acceleration data based on a change of the angular velocity data in a predetermined time period; and
calculate the radius of the rotation based on the acceleration data, the angular velocity data and the angular acceleration data, and wherein the moving velocity is estimated by calculating the moving velocity based on the radius of the rotation and the angular velocity data.

30. The method of claim 27, wherein the processor is controlled to calculate a posture of the input device based on the acceleration data and the angular velocity data.

31. The method of claim 30, wherein:
the acceleration represented by the acceleration data includes a gravitational acceleration; and
the processor is further controlled to:
estimate the gravitational acceleration based on the calculated posture of the input device; and
calculate a motion component, which is an acceleration component other than a gravity component, by removing the gravitational acceleration from the acceleration represented by the acceleration data.

* * * * *